United States Patent
Mazanec et al.

(10) Patent No.: US 10,093,863 B2
(45) Date of Patent: Oct. 9, 2018

(54) GAS JET INJECTOR REACTOR FOR CATALYTIC FAST PYROLYSIS PROCESS

(71) Applicant: Anellotech, Inc., Pearl River, NY (US)

(72) Inventors: Terry J. Mazanec, Solon, OH (US); Jeffrey P. Whiting, Goshen, VT (US); Ruozhi Song, Wilmington, DE (US); Zachary W. Goodman, White Plains, NY (US); Collin Schmidt, Maplewood, NJ (US)

(73) Assignee: Anellotech, Inc., Pearl River, NY (US)

( * ) Notice: Subject to any disclaimer, the term of this patent is extended or adjusted under 35 U.S.C. 154(b) by 514 days.

(21) Appl. No.: 14/161,587

(22) Filed: Jan. 22, 2014

(65) Prior Publication Data

US 2014/0206913 A1    Jul. 24, 2014

Related U.S. Application Data (60) Provisional application No. 61/755,358, filed on Jan. 22, 2013.

(51) Int. Cl.
  *C07C 1/00*    (2006.01)
  *C10G 1/08*    (2006.01)
  (Continued)

(52) U.S. Cl.
  CPC ............ *C10G 1/08* (2013.01); *B01J 6/008* (2013.01); *B01J 8/0025* (2013.01); *B01J 8/0045* (2013.01); *B01J 8/1872* (2013.01); *C10B 49/10* (2013.01); *C10B 53/02* (2013.01); *C10B 57/06* (2013.01); *C10G 2/32* (2013.01); *B01J 2208/0084* (2013.01); *B01J 2208/00176* (2013.01); *B01J 2208/00212* (2013.01); *B01J 2208/00292* (2013.01); *B01J 2208/00548* (2013.01); *B01J 2208/00557* (2013.01); *B01J 2208/00752* (2013.01); *B01J 2208/00938* (2013.01);
  (Continued)

(58) Field of Classification Search
  CPC ......................................................... C10G 3/00
  USPC .......................................... 585/240; 422/145
  See application file for complete search history.

(56) References Cited

U.S. PATENT DOCUMENTS 3,089,889 A * 5/1963 Cleveland ................. C07F 9/40
                                                               558/104
3,533,959 A  10/1970 Miale et al.
(Continued)

FOREIGN PATENT DOCUMENTS

CN        1730178 A     2/2006
CN        1762601 A     4/2006
(Continued)

OTHER PUBLICATIONS

International Search Report and Written Opinion for PCT/US2014/012579, dated Apr. 8, 2014.
(Continued)

*Primary Examiner* — Philip Y Louie
*Assistant Examiner* — Aaron W Pierpont
(74) *Attorney, Agent, or Firm* — Frank Rosenberg (57) ABSTRACT

Methods and systems utilizing gas jets to carry biomass into a biomass conversion reactor are described. Reactor configurations and conditions for carrying out processes utilizing the gas jets are also described. The use of gas jets has been found to be especially desirable for operation with pyrolysis of biomass in catalytic fluidized bed reactors.

33 Claims, 2 Drawing Sheets

(51) Int. Cl.
*B01J 6/00* (2006.01)
*C10B 49/10* (2006.01)
*C10B 53/02* (2006.01)
*C10B 57/06* (2006.01)
*C10G 2/00* (2006.01)
*B01J 8/18* (2006.01)
*B01J 8/00* (2006.01)

(52) U.S. Cl.
CPC .. *C10G 2300/1011* (2013.01); *C10G 2400/30* (2013.01); *Y02E 50/13* (2013.01); *Y02E 50/14* (2013.01); *Y02E 50/32* (2013.01); *Y02P 20/145* (2015.11); *Y02P 30/20* (2015.11)

(56) References Cited

U.S. PATENT DOCUMENTS

| | | | |
|---|---|---|---|
| 4,043,938 | A | 8/1977 | Reif et al. |
| 4,115,929 | A * | 9/1978 | Staub .................. B01J 8/44 34/369 |
| 4,309,948 | A | 1/1982 | Zielinski |
| 4,470,931 | A * | 9/1984 | Callahan ............... B01J 8/0453 422/139 |
| 4,474,119 | A | 10/1984 | Jones |
| 4,935,121 | A | 6/1990 | Fu et al. |
| 5,019,241 | A | 5/1991 | Forester |
| 5,139,649 | A | 8/1992 | Owen et al. |
| 5,175,943 | A * | 1/1993 | Eastham ................ B01J 3/02 110/106 |
| 5,191,391 | A | 3/1993 | Tsai |
| 5,212,127 | A | 5/1993 | Kocal |
| 5,616,237 | A * | 4/1997 | Krishna ............... C10G 11/18 208/113 |
| 5,688,472 | A | 11/1997 | Wachter |
| 5,968,460 | A | 10/1999 | Eastham et al. |
| 6,105,275 | A | 8/2000 | Aulbaugh |
| 6,395,664 | B1 | 5/2002 | Boehner |
| 8,277,643 | B2 | 10/2012 | Huber et al. |
| 8,465,562 | B2 | 6/2013 | Schubert |
| 8,523,496 | B2 | 9/2013 | Bartek |
| 8,772,191 | B2 | 7/2014 | Kerleau et al. |
| 2002/0134019 | A1* | 9/2002 | Paisley ................. C10B 49/22 48/197 R |
| 2005/0252833 | A1* | 11/2005 | Doyle ................... C10G 1/00 208/390 |
| 2009/0227823 | A1* | 9/2009 | Huber ................... C10G 1/002 585/324 |
| 2009/0239279 | A1 | 9/2009 | Hall et al. |
| 2010/0040510 | A1* | 2/2010 | Randhava ............. C01B 3/025 422/140 |
| 2010/0242354 | A1* | 9/2010 | Perkins ................. C01B 3/22 44/639 |
| 2011/0100359 | A1 | 5/2011 | North |
| 2011/0290788 | A1* | 12/2011 | Klemarewski ........ C10B 19/00 219/680 |
| 2012/0090977 | A1* | 4/2012 | Bartek .................. C10G 1/02 201/2.5 |
| 2012/0094355 | A1 | 4/2012 | Medoff |
| 2012/0214113 | A1* | 8/2012 | Kulprathipanja ...... F27B 15/02 432/18 |
| 2012/0251959 | A1 | 10/2012 | Klajny et al. |
| 2013/0019492 | A1 | 1/2013 | Koenig et al. |
| 2013/0060070 | A1 | 3/2013 | Huber et al. |

FOREIGN PATENT DOCUMENTS

| | | |
|---|---|---|
| EP | 0075899 | 6/1985 |
| EP | 0904832 | 3/1999 |
| EP | 0820419 | 7/1999 |
| GB | GB 2022610 | 12/1979 |
| WO | WO9412592 | 6/1994 |
| WO | WO96018564 | 8/1996 |
| WO | 20110031320 A2 | 3/2011 |
| WO | WO11031320 | 3/2011 |
| WO | WO2011162956 | 12/2011 |
| WO | WO13085635 | 6/2013 |
| WO | WO14025479 | 2/2014 |
| WO | WO13095163 | 4/2014 |

OTHER PUBLICATIONS

Roizainee et al., "Effect of Feeding Methods on the Rice Husk Ash Quality in a Fluidized bed Combustor, :" Emirates J. Eng. Res., 15, 1-12 (2010).
WIPO, International Preliminary Report on Patentability, PCT/US2014/012579, dated Jul. 28, 2015.
Asadullah, Mohammed, et al., "Biomass Gasification to Hydrogen and Syngas at Low Temperature: Novel Catalytic System Using Fluidized-Bed Reactor", Journal of Catalysis 208, 255-259 (2002).
Cao, Yan, Institute for Combustion Science and Environmental Technology, Combustion Laboratory Reactors, Issue #3, 2009.
Dickerson, Theodore, et al., "Catalytic Fast Pyrolysis: a review", Energies 2013, 6, 514-538; doi: 10.3390/.
Huber, G.W., et al., "Synthesis of Transportation Fuels from Biomass: Chemistry, Catalysts, and Engineering," Chem. Rev. 106 (2006), pp. 4044-4098.
Jong, Sung-Jeng et al, On the Regeneration of Coked H-ZSM-5 Catalysts:, Journal of Catalysis 174, 210-218 ( 1998) Article No. CA981971.
Taarning, Esben et al., Zeolite-catalysed biomass conversion to fuels and chemicals:, Energy Environment Science, 2011, 4, 793-804.
Torren, R. Carlson et al, "Production of green aromatics and olefins by catalytic fast pyrolysis process of wood sawdust", Energy & Environmental Science, vol. 4, No. 1, Jan. 1, 2011 (Jan. 1, 2011), p. 145 DOI.
Zhang, Zingchang, et al., "Study of the deactiviation and regeneration of the ZSM-5 catalyst used in methanol to olefins", Journal of Natural Gas Chemistry, 20 (2011) 266-270.
International Search Report from International Application No. PCT/US2014/024855 dated Dec. 22, 2014.
Written Opinion of the International Searching Authority from International Application No. PCT/US2014/024855 dated Sep. 12, 2015.
International Preliminary Examination Report on Patentability, from International Application No. PCT/US2014/024855 dated Sep. 12, 2015.
Official Action from Chinese Patent Application No. 201480014853.9 dated Dec. 5, 2016, with translation.
Communication pursuant to Article 94(3) EPC dated Mar. 20, 2017 in EP Application No. 14703225.4.
A.V. Bridgwater: "Review of fast pyrolysis of biomass and product upgrading,", Biomass and Bioenergy, Mar. 3, 2011 (Mar. 3, 2011), pp. 68-94, vol. 38, XP055209446, ISSN: 0961-9534, DOI: 10.1016/jbiombioe.2011.01.048.

* cited by examiner

GAS JET INJECTOR REACTOR FOR CATALYTIC FAST PYROLYSIS PROCESS

RELATED APPLICATIONS

This application claims the benefit of the priority of U.S. Provisional Patent Application Ser. No. 61/755,358, filed 22 Jan. 2013.

FIELD OF INVENTION

This invention relates to methods for the production of biochemicals such as biofuel, aromatics, and olefin compounds, and more specifically, to process feed methods, systems, and apparatus for the production of fuels and chemicals via catalytic fast pyrolysis.

BACKGROUND

Biomass upgrading requires the feeding of a variety of particulate solid materials such as wood chips, sawdust, yard waste, cuttings, other vegetation; agricultural products and agricultural waste (e.g., corn stover, bagasse, fruit, garbage, silage, etc.); energy crops (e.g. switchgrass, miscanthus); algae and other marine plants; metabolic wastes (e.g., manure, sewage); and cellulosic urban waste etc., to a fluidized bed of catalyst for catalytic fast pyrolysis. Partially upgraded or converted biomass, such as pyrolysis oils, carbohydrates, digestion products or the like, that are often liquids or semi-solids, could also be used in the process, either alone or in combination with solid feeds.

The catalytic fast pyrolysis process (CFP) of biomass requires the conversion of a variety of high molecular weight materials such as lignin, cellulose, and hemi-cellulose, by pyrolysis in the presence of a catalyst, preferably an acidic, micro-porous catalyst, usually a zeolite. The zeolite is active for the upgrading of the primary pyrolysis products of biomass decomposition, and converts them to aromatics, olefins, CO/CO2, char, coke, water, and other useful materials.

For the catalytic fast pyrolysis process (CFP) to be effective, biomass must not be heated above the temperature at which pyrolysis begins, typically about 150-200° C., before it is in the vicinity of the catalyst to maximize the interaction of the primary pyrolysis products with the catalyst for conversion to aromatics, olefins and other useful materials. At the same time, when the biomass is heated, it must be heated very rapidly, at heating rates as much as 500° C./sec, to minimize formation of char and maximize the production of useful materials. Thus, a problem in the fast pyrolysis and catalytic fast pyrolysis of biomass is how to introduce the biomass feed into the pyrolysis reactor, keeping it from heating prematurely in the feed line where char can form and yet heating it very rapidly once it enters the reaction zone.

Screw auger feed devices have been used to feed the biomass to fluidized bed reactors, but the linear flow rate of the biomass is relatively slow in the feed auger, so the biomass can be heated as it approaches the hot catalyst bed, resulting in char formation and low yields of aromatics and olefins. Premature partial pyrolysis of the biomass also releases oily intermediates that can clog the movement of the auger. Scale up of the auger feed system is problematic as well since an auger that extends into the center of a large reactor would necessarily become quite hot or would require cooling that wastes heat and cools the reactor bed. The present invention overcomes the problems involved in feeding biomass into a hot, fast pyrolysis or hot, catalytic fast pyrolysis reactor by use of a gas jet to feed the biomass into the fluid bed.

In U.S. Pat. No. 6,105,275, a continuous rotary vacuum retort apparatus and its use are described. The patent mentions the use of elastomeric pinch valves used to create an airlock in a vacuum retort but not operation under elevated pressures or as feed system for a catalyzed fluid bed. In EP 0075899, a process for transferring solids is described in which a gas is used as a barrier for metering of solids between two pressure controlled vessels. In EP 0820419 B1, an air lock for pneumatic conveyance and separation of solids from the conveying air is described that employs a rotary airlock for removing solids from conveying airstream. In WO 1996018564 B1, a vertical-shaft airlock is described that uses rotating mechanical seals. In WO 2013095163 A1, a continuous pyrolysis apparatus is described wherein pyrolysis occurs on an auger with material admitted and expelled by use of airlocks. No airlock structure specified beyond 'valves'. In US 20130019492, a system for the continuous treatment of solids at non-atmospheric pressure is described using a semi-batch airlock that is loaded with enough material to continuously supply a process prior to being reloaded as in a typical lock-hopper system.

Asadullah et al., in "Biomass Gasification to Hydrogen and Syngas at Low Temperature: Novel Catalytic System Using Fluidized-Bed Reactor," J. Catal. 208, 255-259 (2002), described an experimental combustion system in which cellulose was continuously transported into a fluidized catalyst bed through a 5 mm outlet in a feed hopper by the flow of N2 gas through an inner tube of 5 mm inner diameter into a concentric tube of 18 mm inner diameter containing a catalyst bed containing a Rh/CeO2/SiO2 catalyst. The cellulose was converted to hydrogen and CO.

Eastham et al. in U.S. Pat. No. 5,968,460 and U.S. Pat. No. 5,175,943 describe methods of continuously adding solids to a combustion process conducted in a fluidized bed from a standpipe having an angle that has a bend to hold back the solids. The standpipe contains gas inlets to maintain the pressure slightly above that in the fluidized bed. The gases added to the standpipe can be used to fluidize the solids in the standpipe and lessen the binding of particles.

Medoff in US 2012/0094355 describes a noncatalytic process in which pressurized gases can be added to a biomass-derived feedstock stream to propel the feedstock into a pyrolysis chamber to produce sugars or amino acids.

Jones, in U.S. Pat. No. 4,474,119 discloses a fluidized bed combustion furnace in which coarse limestone is added through a nozzle into the fluidized bed and solid fines are added along with the fluidization fluid. The fine feed solids can be added tangentially.

Rozainee et al., in "Effect of Feeding Methods on the Rice Husk Ash Quality in a Fluidised Bed Combustor," Emirates J. Eng. Res., 15, 1-12 (2010), reported the results of a study in which rice husks are fed by gas injection into a fluidized bed combustion chamber from an inlet inclined at a 45° angle. The ash produced in the combustion when feed entered the reaction chamber from a tangentially disposed inlet was reported to have smaller particle size and lower carbon content than ash produced with radial feed.

North et al. (Nova Pangea Technologies) in US Patent Appl 20110100359 describes a 5-step process that includes entraining biomass solids in a flow of superheated steam in a steam loop to cause the cells to explode prior to introduction of the biomass in a hydrolysis reactor and condensation of the hydrolyzed sugar-containing materials. Zielinski et al. in U.S. Pat. No. 4,309,948 describe delivery of an entrained stream of carbonaceous solid particles to a catalyst bed through a mushroom-shaped cap. Wachter in U.S. Pat. No. 5,688,472 describes using a downward flow of gas through an annulus to fluidize a reactor bed. Klajay et al. in US 2012/0251959 disclose a fluidized bed fuel feed system that introduces the solid fuel along a channel in the wall into a grid section to increase the time of the heatup of the fuel to dry the fuel, i.e., reduce the rate of heating, before it enters the turbulent fluid bed. Bartek in U.S. Pat. No. 8,523,496 describes a process for feeding biomass to a reactor for conversion to oxygenated hydrocarbons that utilizes a spool piece adapted to convey solids from a lower pressure to a higher pressure; however, other than increasing pressure, no steps are taken to control injection conditions or reduce preheating of the biomass.

Thus a need exists for a process and apparatus for feeding biomass to a fluid bed or similar reactor that minimizes premature heating of the biomass and mixes it rapidly with the materials in the reactor.

SUMMARY OF THE INVENTION

The present invention comprises a novel feed system for introducing biomass into a pyrolysis reactor, such as a catalytic fast pyrolysis (CFP) fluid bed reactor, that employs a jet stream of gas or vapor to inject the biomass particles into the fluid bed. The biomass is kept relatively cool, can be metered upstream of a gas jet, and can be injected far into the fluid bed. Good mixing between the relatively cooler biomass with the hot catalyst and other materials in the fluid bed can be insured by adjustment of the number, size, angle, position, and flow rate of the multiple injector ports in larger reactors. The invention may further comprise an automated feed metering system comprising pinch valves and a holding tank that allows operation of the CFP process at higher pressure while allowing the feed to be maintained at lower pressures and injects the biomass in discrete portions that penetrate further into the reactor enhancing mixing and rapid heating of the biomass.

In a first aspect, the invention provides a method for producing one or more fluid hydrocarbon products from a solid hydrocarbonaceous material comprising: feeding a first reactant comprising the solid hydrocarbonaceous material to a reactor by injection in a gas jet; pyrolyzing within the reactor at least a portion of the hydrocarbonaceous material under reaction conditions sufficient to produce one or more pyrolysis products; and catalytically reacting at least a portion of the one or more pyrolysis products under reaction conditions sufficient to produce the one or more fluid hydrocarbon products; and further comprising one or more of the following characteristics: wherein the gas jet comprises a carrier fluid and the solid hydrocarbonaceous material, wherein the gas jet enters the reactor through a feed port and wherein the carrier fluid flows through the feed port with a linear velocity of at least 25 cm/sec; or wherein the solid hydrocarbonaceous material is feed though a feed port into a fluidization reactor with a ratio of gas flow rate through the feed port to flow through a fluidization port of less than 10; or wherein the solid hydrocarbonaceous material is fed into the reactor through a feed port wherein the feed port has an angle that is at least 15 degrees from the horizontal.

In some preferred aspects, the linear velocity of the carrier fluid in the feed port is at least 25 cm/sec, 50 cm/sec, 100 cm/sec, 150 cm/sec, or at least 200 cm/sec, or at least 225 cm/sec, or at least 250 cm/sec, or at least 300 cm/sec, or from 25 cm/sec to 10,000 cm/sec, or from 50 to 7,000 cm/sec, or from 100 to 5,000 cm/sec, or from 200 to 5,000 cm/sec, or from 225 to 5,000 cm/sec.

In some preferred aspects, the ratio of gas flow rate injected with the solid hydrocarbonaceous material to the gas flow rate introduced through the fluidization port is less than 0.1, less than 0.25, less than 0.5, less than 1, less than 2, less than 3, less than 5, or less than 10. In some preferred embodiments, the space velocity of the biomass in comparison to the catalyst contained in the reactor is at least 0.1, at least 0.2, at least 0.3, at least 0.4, at least 0.5, at least 0.8, or at least 1.0, or from 0.1 to 2.0.

An advantage of the inventive methods and systems is improved yield of aromatics; preferably the carbon percent yield of aromatics plus olefins is at least 15%, at least 20%, at least 25%, at least 30%, or at least 35%. In some preferred embodiments, the carbon percent yield of para- and meta-xylene is at least 0.5%, at least 1.0%, at least 1.5%, at least 2.0%, or at least 2.5%. In some preferred embodiments, the carbon percent yield of methane is less than 10%, less than 5%, less than 4%, less than 3%, less than 2% or less than 1.5%.

In some preferred embodiments, the fluidization gas residence time in contact with the catalyst bed is at least 0.1, at least 0.2, at least 0.3, at least 0.5, at least 0.7, at least 1.0, at least 2.0, at least 3.0 seconds, or at least 5.0 seconds, or at least 10.0 seconds, or at least 20 seconds, and in some embodiments less than 60 seconds, or less than 40 seconds.

In some aspects, catalyst is fed in a continuous or semi-continuous manner to the reactor and catalyst is withdrawn in a continuous or semi-continuous manner from the reactor.

In some preferred embodiments, the solid hydrocarbonaceous material is fed into the reactor through a feed port wherein the feed port has an angle that is at least 15 degrees, at least 25 degrees, at least 35 degrees, at least 45 degrees, at least 50 degrees, or at least 62 degrees from the horizontal at the point at which it enters the reactor, where the maximum angle of the feed port is about 90°.

In some preferred embodiments, a gas for the gas jet is carried through a carrier flow tube that carries the gas into the feed, and wherein the angle that the carrier flow tube makes with the horizontal is greater than the angle at which the biomass feed tube enters the pyrolysis reactor, both being positive values.

In some embodiments, the ratio of gas flow rate injected with the solid hydrocarbonaceous material biomass to the gas flow rate introduced through the fluidization port is between 0.001 and 10, or between 0.01 and 5, or between 0.1 and 2.

In some embodiments, the solid hydrocarbonaceous material is fed in discontinuous pulses in the gas feed. In some preferred embodiments, the frequency of the pulses of solid hydrocarbonaceous material fed from any one feed port is in the range from once every 0.2 seconds to one pulse every 60 seconds. In some embodiments, the duration of flow during an individual pulse from a single feed port is between 0.05 seconds and 30 seconds in length.

In another aspect, the invention provides a system for producing one or more fluid hydrocarbon products from a hydrocarbonaceous material comprising a pyrolysis zone into which a solid hydrocarbonaceous material is introduced by injection in a flowing gas stream, a solid catalyst is introduced, and at least a portion of the hydrocarbonaceous material pyrolyzes and catalytically reacts under reaction conditions sufficient to produce one or more pyrolysis products. This system may be further characterized by one or more of the characteristics described above with respect to the first aspect. Preferably, the solid hydrocarbonaceous material is introduced by the injection in a flowing gas stream into a reactor comprising a fluidized bed, and wherein, prior to introduction to the fluidized bed, the hydrocarbonaceous material is maintained at a temperature less than 300° C., or less than 200° C. or less than 150° C., or less than 100° C., or maintained with a range of temperatures from 20° C. to 300° C., 20° C. to 200° C., 20° C. to 150° C., or 20° C. to 100° C. (as with other features described herein, these temperature ranges also apply to preferred embodiments of the methods and operation of the apparatus; the invention can also be characterized as having these temperature ranges in the feed tube, and preferably in combination with the absence of a screw auger since a screw auger can increase temperature in the feed tube). In some preferred embodiments, the solid hydrocarbonaceous material is fed into the reactor through a feed port wherein the feed port has an angle that is at least 15 degrees, at least 25 degrees, at least 35 degrees, at least 45 degrees, at least 50 degrees, or at least 62 degrees from the horizontal at the point at which it enters the reactor, where the maximum angle of the feed port is about 90°.

Any of the features discussed with respect to the methods may also be incorporated into the inventive systems. For example, similar to what is discussed above, a gas for the gas jet can be carried through a carrier flow tube that carries the gas into the feed, and wherein the angle that the carrier flow tube makes with the horizontal is greater than the angle at which the biomass feed tube enters the pyrolysis reactor, both being positive values. The solid hydrocarbonaceous material is fed in discontinuous pulses in the gas feed. The frequency of the pulses of solid hydrocarbonaceous material fed from any one feed port is in the range from once every 0.2 seconds to one pulse every 60 seconds. In some embodiments, the duration of flow during an individual pulse from a single feed port is between 0.05 seconds and 30 seconds in length.

In another aspect, the invention provides an apparatus for producing one or more fluid hydrocarbon products from a hydrocarbonaceous material, which apparatus comprises in combination: a pyrolysis reaction chamber; at least one feed tube by which solid hydrocarbonaceous material may be introduced by gas-assisted injection into the pyrolysis reaction chamber, wherein the angle α of the feed port is at least 15 degrees from the horizontal; a delivery structure by which solid catalyst may be introduced therein; a fluidization gas inlet line connecting with a lower portion of said reaction chamber for introducing a fluidization gas; a catalyst exit conduit; and a product exit conduit from which vapor phase products may exit the reactor. In some preferred embodiments, the angle α of the feed port is at least 25 degrees, at least 35 degrees, at least 45 degrees, at least 50 degrees, or at least 62 degrees from the horizontal, where the maximum angle of the feed port is about 90°. Delivery structures for delivering catalyst to pyrolysis reactors are known in the art. In some preferred embodiments, the apparatus further comprises a carrier flow tube that is adapted to carry the gas into the feed, and wherein the angle that the carrier flow tube makes with the horizontal is greater than the angle at which the biomass feed tube enters the pyrolysis reactor, both being positive values.

In some preferred embodiments, a delivery structure by which a solid catalyst may be introduced to the pyrolysis reaction chamber comprises a tube containing catalyst particles.

In preferred embodiments, during operation of the apparatus, prior to introduction to the fluidized bed, the hydrocarbonaceous material is maintained at a temperature less than 300° C., or less than 200° C. or less than 150° C., or less than 100° C., or maintained with a range of temperatures from 20° C. to 300° C., 20° C. to 200° C., 20 C to 150° C., or 20° C. to 100° C.

In a further aspect, the invention provides a method or system for producing one or more fluid hydrocarbon products from a solid hydrocarbonaceous material comprising: feeding a first reactant comprising the solid hydrocarbonaceous material to a fluidized bed reactor comprising a distributor by injection of the solid material in a gas jet or gas jets through a port or ports, wherein the carrier gas in the gas jet is at a temperature of less than 200° C., to form a gas mixture comprising suspended solid particles in a lower section of the reactor that has a normalized temperature in the range of 100 to 600° C.; pyrolyzing within an upper section of the reactor at least a portion of the gas mixture comprising suspended solid particles in a catalyzed reaction at a temperature of at least 500° C. to produce one or more pyrolysis products; wherein the upper section is above the lower section with respect to gravity; wherein the lower section comprises a volume that includes an inner diameter of the fluidized bed reactor and a height that is at least 2% of the total reactor height, and wherein the upper section comprises a volume that includes an inner diameter of the fluidized bed reactor and a height that is at least 5% of the total reactor height; wherein the lower and upper sections are both above the distributor. Preferably, the method or system further comprises feeding a fluidizing gas into the lower section. Also, preferably, the fluidizing gas passes through a distributor prior to entering the lower section. In some embodiments, the lower section does not contain any catalyst trays and the upper section comprises at least one catalyst tray. In some embodiments, the lower section contains less than 10 wt % of the total catalyst in the reactor and the upper section comprises at least 50 wt % of the total catalyst in the reactor. In some embodiments, the upper section has a temperature in the range of 500° C. to 800° C.

In a further aspect, the invention provides a system for producing one or more fluid hydrocarbon products from a solid hydrocarbonaceous material comprising: a fluidized bed reactor comprising a lower section and an upper section; wherein the lower section comprises a gas mixture and suspended biomass solids, wherein the gas mixture is in a temperature range of 100 to 400° C. (preferably 200 to 350° C.); and wherein the upper section comprises a suspension of catalyst particles and fully or partially pyrolyzed biomass and wherein the upper section comprises a temperature of at least 500° C. Preferably, the lower section is disposed immediately above a distributor and the lower section comprises a gas injector inlet through which a gas carrying biomass is introduced and wherein a fluidizing gas that does not contain biomass passes through the distributor and forms a mixture with the gas carrying the biomass that flows into the reactor through the gas injector.

It should be understood that the descriptions herein are to be read broadly and any of the methods, apparatus and systems may incorporate any of the features discussed throughout this specification.

Glossary

Aromatics—As used herein, the terms "aromatics" or "aromatic compound" are used to refer to a hydrocarbon compound or compounds comprising one or more aromatic groups such as, for example, single aromatic ring systems (e.g., benzyl, phenyl, etc.) and fused polycyclic aromatic ring systems (e.g. naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, methylbenzene, propylbenzene, xylenes (e.g., p-xylene, m-xylene, o-xylene), naphthalene, methyl-naphthalene (e.g., 1-methyl naphthalene, anthracene, 9.10-dimethylanthracene, pyrene, phenanthrene, dimethyl-naphthalene (e.g., 1,5-dimethylnaphthalene, 1,6-dimethylnaphthalene, 2,5-dimethylnaphthalene, etc.), ethyl-naphthalene, hydrindene, methyl-hydrindene, and dymethyl-hydrindene. Single-ring and/or higher ring aromatics may also be produced in some embodiments. Aromatics also include single and multiple ring compounds that contain heteroatom substituents, ie phenol, cresol, benzofuran, etc.

Biomass—As used herein, the term "biomass" is given its conventional meaning in the art and is used to refer to any organic source of energy or chemicals that is renewable. Its major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098. Biomass is conventionally defined as the living and recently dead biological material that can be converted for use as fuel or for industrial production. The criterion for biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burnt as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. The particular plant or other biomass source used is not important to the product chemical or fuel although the processing of the raw material for introduction to the processing unit will vary according to the needs of the unit and the form of the biomass.

Biomass-derived—Any of the products, processes, and/or systems described herein may be additionally characterized by the fact that they are biomass-derived, meaning that the products are at least partly derived from biomass, and, in most cases are 100% or nearly 100% derived from biomass. As is well-known, the presence of biomass-derived material can be readily ascertained by the presence of 14C, which is present in significantly lower concentrations in fossil fuels.

Biomass Pyrolysis Liquid—Biomass pyrolysis liquid or bio-oil is the liquid fraction that can be isolated from a pyrolysis reaction of biomass. Biomass pyrolysis liquid is usually dark brown and approximates to biomass in elemental composition. It is composed of a very complex mixture of oxygenated hydrocarbons with an appreciable proportion of water from both the original moisture and reaction product. Compositionally, the biomass pyrolysis oil will vary with the type of biomass, but is known to consist of oxygenated low molecular weight alcohols (e.g., furfuryl alcohol), aldehydes (aromatic aldehydes), ketones (furanone), phenols (methoxy phenols) and water. Solid char may also be present, suspended in the oil. The liquid is formed by rapidly quenching the intermediate products of flash pyrolysis of hemicellulose, cellulose and lignin in the biomass. Chemically, the oil contains several hundred different chemicals in widely varying proportions, ranging from formaldehyde and acetic acid to complex, high molecular weight phenols, anhydrosugars and other oligosaccharides. It has a distinctive odor from low molecular weight aldehydes and acids, is usually acidic with a pH of 1.5-3.8, and can be an irritant.

Catalysts—Catalyst components useful in the context of this invention can be selected from any catalyst known in the art, or as would be understood by those skilled in the art. Catalysts promote and/or effect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, isomerization, hydrogen transfer, aromatization, decarbonylation, decarboxylation, aldol condensation, polymerization, and combinations thereof. Catalyst components can be considered acidic, neutral or basic, as would be understood by those skilled in the art.

For fast catalytic pyrolysis, particularly advantageous catalysts include those containing internal porosity selected according to pore size (e.g., mesoporous and pore sizes typically associated with zeolites), e.g., average pore sizes of less than about 100 Angstroms, less than about 50 Angstroms, less than about 20 Angstroms, less than about 10 Angstroms, less than about 5 Angstroms, or smaller. In some embodiments, catalysts with average pore sizes of from about 5 Angstroms to about 100 Angstroms may be used. In some embodiments, catalysts with average pore sizes of between about 5.5 Angstroms and about 6.5 Angstroms, or between about 5.9 Angstroms and about 6.3 Angstroms may be used. In some cases, catalysts with average pore sizes of between about 7 Angstroms and about 8 Angstroms, or between about 7.2 Angstroms and about 7.8 Angstroms may be used. Catalysts may have bimodal or multimodal distributions of pores such that there are significant numbers of pores of a small size and a significant number of pores of a larger size or sizes.

In some preferred embodiments of CFP, the catalyst may be selected from naturally occurring zeolites, synthetic zeolites and combinations thereof. In certain embodiments, the catalyst may be a ZSM-5 zeolite catalyst, as would be understood by those skilled in the art. Optionally, such a catalyst can comprise acidic sites. Other types of zeolite catalysts include: ferrierite, zeolite Y, zeolite beta, mordenite, MCM-22, ZSM-23, ZSM-57, SUZ-4, EU-1, ZSM-11, (S)AlPO-31, SSZ-23, among others. In other embodiments, non-zeolite catalysts may be used; for example, $WO_x/ZrO_2$, aluminum phosphates, etc. In some embodiments, the catalyst may comprise a metal and/or a metal oxide. Suitable metals and/or oxides include, for example, nickel, palladium, platinum, titanium, vanadium, chromium, manganese, iron, cobalt, zinc, copper, gallium, and/or any of their oxides, among others. In some cases promoter elements chosen from among the rare earth elements, i.e., elements 57-71, cerium, zirconium or their oxides for combinations of these may be included to modify activity or structure of the catalyst. In addition, in some cases, properties of the catalysts (e.g., pore structure, type and/or number of acid sites, etc.) may be chosen to selectively produce a desired product.

Conversion—The term "conversion of a reactant" refers to the reactant mole or mass change between a material flowing into a reactor and a material flowing out of the reactor divided by the moles or mass of reactant in the material flowing into the reactor. For example, if 100 grams of ethylene are fed to a reactor and 30 grams of ethylene are flowing out of the reactor, the conversion is [(100−30)/100]=70% conversion of ethylene.

Distributor. A distributor is a structure that distributes the fluidizing gas to maintain a stable fluidization over the desired area (usually the area of a cylindrical reactor in the reactor zone). In some embodiments, the distributor is a plate with orifices to equalize pressure over the area of the cylinder in the reactor zone.

Feed port. A feed port (also referred to as a feed tube) is an inlet through which biomass enters into a reactor. The angle α of the feed tube is the angle at which feed enters the reactor. The angle of the feed tube is measured as the average angle of the feed tube (or feed conduit) over the section immediately preceding the reactor, determined by drawing a straight line from the position where the biomass enters the conduit to the position where the conduit opens into the reactor. In systems in which a carrier tube uses a gas assist from a first gas stream to move biomass from a hopper at a first angle and the biomass then flows into a feed tube at a second angle, where the feed tube has a second gas stream to move the biomass into the reactor, the angle α is measured only over the distance of the feed tube and does not include the carrier tube. Temperature in the feed tube is preferably maintained at 200° C. or below, preferably 150° C. or less, and still more preferably 100° C. or less, and sometimes in the range of 0 to 150° C. The linear velocity of carrier fluid through the feed port (also known as injector port) is calculated based on the inner diameter of the feed port at the interface with the volume of the reactor.

Fluid—The term "fluid" refers to a gas, a liquid, a mixture of a gas and a liquid, or a gas or a liquid containing dispersed solids, liquid droplets and/or gaseous bubbles. The terms "gas" and "vapor" have the same meaning and are sometimes used interchangeably. In some embodiments, it may be advantageous to control the residence time of the fluidization fluid in the reactor. The fluidization residence time of the fluidization fluid is defined as the volume of the reactor divided by the volumetric flow rate of the fluidization fluid under process conditions of temperature and pressure.

Fluidized Bed Reactor—As used herein, the term "fluidized bed reactor" is given its conventional meaning in the art and is used to refer to reactors comprising a vessel that can contain a granular solid material (e.g., silica particles, catalyst particles, etc.), in which a fluid (e.g., a gas or a liquid) is passed through the granular solid material at velocities sufficiently high as to suspend the solid material and cause it to behave as though it were a fluid. As is well known, in a fluidized bed reactor suspended solids such as catalysts, or solid reactants, or heat transfer materials, or some combination of these, are above the distributor. In some fluidized bed reactors solid reactants, solid catalysts, or other solids are introduced immediately above the distributor in a lower section of the reactor, and there is an upper section of the reactor that extends above the lower section. In the reactor the upper section is above the lower section with respect to gravity. In the reactor the lower section comprises a volume that includes an inner diameter of the fluidized bed reactor and a height that is at least 2%, or at least 5%, or at least 10%, or at least 15%, or at least 25% of the total reactor height, and wherein the upper section comprises a volume that includes an inner diameter of the fluidized bed reactor and a height that is at least 5%, or at least 10%, or at least 15%, or at least 25% of the total reactor height. Thus, the lower section that comprises suspended solids refers to a section that is above the distributor.

The term "circulating fluidized bed reactor" is also given its conventional meaning in the art and is used to refer to fluidized bed reactors in which the granular solid material is passed out of the reactor, circulated through a line in fluid communication with the reactor, and recycled back into the reactor.

Bubbling fluidized bed reactors and turbulent fluidized bed reactors are also known to those skilled in the art. In bubbling fluidized bed reactors, the fluid stream used to fluidize the granular solid material is operated at a sufficiently low flow rate such that bubbles and voids are observed within the volume of the fluidized bed during operation. In turbulent fluidized bed reactors, the flow rate of the fluidizing stream is higher than that employed in a bubbling fluidized bed reactor, and hence, bubbles and voids are not observed within the volume of the fluidized bed during operation.

Examples of fluidized bed reactors, circulating fluidized bed reactors, bubbling and turbulent fluidized bed reactors are described in Kirk-Othmer Encyclopedia of Chemical Technology (online), Vol. 11, Hoboken, N.J.: Wiley¬ Interscience, c2001-, pages 791-825, and in "Fluidization Engineering", $2^{nd}$ Edition, by D. Kunii and O. Levenspiel, Butterworth-Heinemann, 1991, Newton, Mass., both of which are incorporated herein by reference.

A gas jet is a stream of gas that carries solids into a biomass conversion reactor. A gas jet is an added gas and does not refer to gases generated by decomposition of biomass in a feed tube (sometimes referred to as the feed conduit); in fact, gas decomposition of biomass in a feed tube is not desired. The use of a gas jet to carry biomass into a reactor is also known as "gas-assisted injection."

Pore size—Pore size relates to the size of a molecule or atom that can penetrate into the pores of a material. As used herein, the term "pore size" for zeolites and similar catalyst compositions refers to the Norman radii adjusted pore size well known to those skilled in the art. Determination of Norman radii adjusted pore size is described, for example, in Cook, M.; Conner, W. C., "How big are the pores of zeolites?" Proceedings of the International Zeolite Conference, 12th, Baltimore, Jul. 5-10, 1998; (1999), 1, pp 409-414, which is incorporated herein by reference in its entirety. As a specific exemplary calculation, the atomic radii for ZSM-5 pores are about 5.5-5.6 Angstroms, as measured by x-ray diffraction. In order to adjust for the repulsive effects between the oxygen atoms in the catalyst, Cook and Conner have shown that the Norman adjusted radii are 0.7 Angstroms larger than the atomic radii (about 6.2-6.3 Angstroms).

One of ordinary skill in the art will understand how to determine the pore size (e.g., minimum pore size, average of minimum pore sizes) in a catalyst. For example, x-ray diffraction (XRD) can be used to determine atomic coordinates. XRD techniques for the determination of pore size are described, for example, in Pecharsky, V. K. et at, "Fundamentals of Powder Diffraction and Structural Characterization of Materials," Springer Science+Business Media, Inc., New York, 2005, incorporated herein by reference in its entirety. Other techniques that may be useful in determining pore sizes (e.g., zeolite pore sizes) include, for example, helium pycnometry or low-pressure argon adsorption techniques. These and other techniques are described in Magee, J. S. et at, "Fluid Catalytic Cracking: Science and Technology," Elsevier Publishing Company, Jul. 1, 1993, pp. 185-195, which is incorporated herein by reference in its entirety. Pore sizes of mesoporous catalysts may be determined using, for example, nitrogen adsorption techniques, as described in Gregg, S. J. at al, "Adsorption, Surface Area and Porosity," 2nd Ed., Academic Press Inc., New York, 1982 and Rouquerol, F. et al, "Adsorption by powders and porous materials. Principles, Methodology and Applications," Academic Press Inc., New York, 1998, both incorporated herein by reference in their entirety.

In some embodiments, a screening method is used to select catalysts with appropriate pore sizes for the conversion of specific pyrolysis product molecules. The screening method may comprise determining the size of pyrolysis product molecules desired to be catalytically reacted (e.g., the molecule kinetic diameters of the pyrolysis product molecules). One of ordinary skill in the art can calculate, for example, the kinetic diameter of a given molecule. The type of catalyst may then be chosen such that the pores of the catalyst (e.g., Norman adjusted minimum radii) are sufficiently large to allow the pyrolysis product molecules to diffuse into and/or react with the catalyst. In some embodiments, the catalysts are chosen such that their pore sizes are sufficiently small to prevent entry and/or reaction of pyrolysis products whose reaction would be undesirable.

Pyrolysis—For purposes of the present invention, and as is generally known, pyrolysis of biomass is a reaction that occurs at temperatures of at least 400° C. and is capable of proceeding in the absence of an added catalyst (although an added catalyst may be present) to form at least one pyrolysis product (typically a mixture of products). Added catalyst is a catalyst that is not present in the biomass (that is, not naturally occurring or inherently present). An example of pyrolysis is heating biomass to temperatures above 400° C. to form furfural and other products. Catalytic reaction is a reaction in which a material reacts in the presence of an added catalyst and the presence of the catalyst affects the speed of reaction and/or product distribution (typically both). As a practical matter, in situations where added catalyst is present, both pyrolysis and catalytic reactions occur if the temperature is sufficiently high (for example, at least 400° C.). Experimentally, the occurrence of pyrolysis could be tested by running a reaction in the absence of added catalyst—if a substantial reaction occurs under the reaction conditions, then pyrolysis is occurring. A "substantial reaction" is one where more than a trivial amount of biomass is converted (for example, at least 5%) to products. A "pyrolysis zone" is the volume of the reactor system that is heated to temperatures at which a substantial pyrolysis reaction occurs at reaction conditions (such as residence time).

Pyrolysis is preferably conducted without the addition of, or in the absence of, O2. Preferably, the volume fraction of O2 present in a pyrolysis reaction chamber is 0.5% or less. "Catalytic pyrolysis" refers to pyrolysis performed in the presence of a catalyst, and may involve steps as described in more detail below. Example of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098.

Residence Time—Residence time is defined as the volume of the reactor or device, or specific portion of a device, divided by the exit flow of all gases out of the reactor, or device or portion of the reactor or device, including fluidization gas, products, and impurities, measured or calculated at the average temperature of the reactor or device and the exit pressure of the reactor or device or portion thereof.

Selectivity—The term "selectivity" refers to the amount of production of a particular product in comparison to a selection of products. Selectivity to a product may be calculated by dividing the amount of the particular product by the amount of a number of products produced. For example, if 75 grams of aromatics are produced in a reaction and 20 grams of benzene are found in these aromatics, the selectivity to benzene amongst aromatic products is $20/75=26.7\%$. Selectivity can be calculated on a mass basis, as in the aforementioned example, or it can be calculated on a carbon basis, where the selectivity is calculated by dividing the amount of carbon that is found in a particular product by the amount of carbon that is found in a selection of products. Unless specified otherwise, for reactions involving biomass as a reactant, selectivity is on a mass basis. For reactions involving conversion of a specific molecular reactant (ethene, for example), selectivity is the percentage (on a mass basis unless specified otherwise) of a selected product divided by all the products produced.

Yield—The term yield is used herein to refer to the amount of a product flowing out of a reactor divided by the amount of reactant flowing into the reactor, usually expressed as a percentage or fraction. Yields are often calculated on a mass basis, carbon basis, or on the basis of a particular feed component. Mass yield is the mass of a particular product divided by the weight of feed used to prepare that product. For example, if 500 grams of biomass is fed to a reactor and 45 grams of benzene is produced, the mass yield of benzene would be $45/500=9\%$ benzene. Carbon yield is the mass of carbon found in a particular product divided by the mass of carbon in the feed to the reactor. For example, if 500 grams of biomass that contains 40% carbon is reacted to produce 45 grams of benzene that contains 92.3% carbon, the carbon yield is $[(45*0.923)/(500*0.40)]=20.8\%$. Carbon yield from biomass is the mass of carbon found in a particular product divided by the mass of carbon fed to the reactor in a particular feed component. For example, if 500 grams of biomass containing 40% carbon and 100 grams of CO2 are reacted to produce 40 g of benzene (containing 92.3% carbon), the carbon yield on biomass is $[(40*0.923)/(500*0.40)]=18.5\%$; note that the mass of CO2 does not enter into the calculation.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but, rather, listing exemplary components.

DETAILED DESCRIPTION OF THE INVENTION

Figure 1:
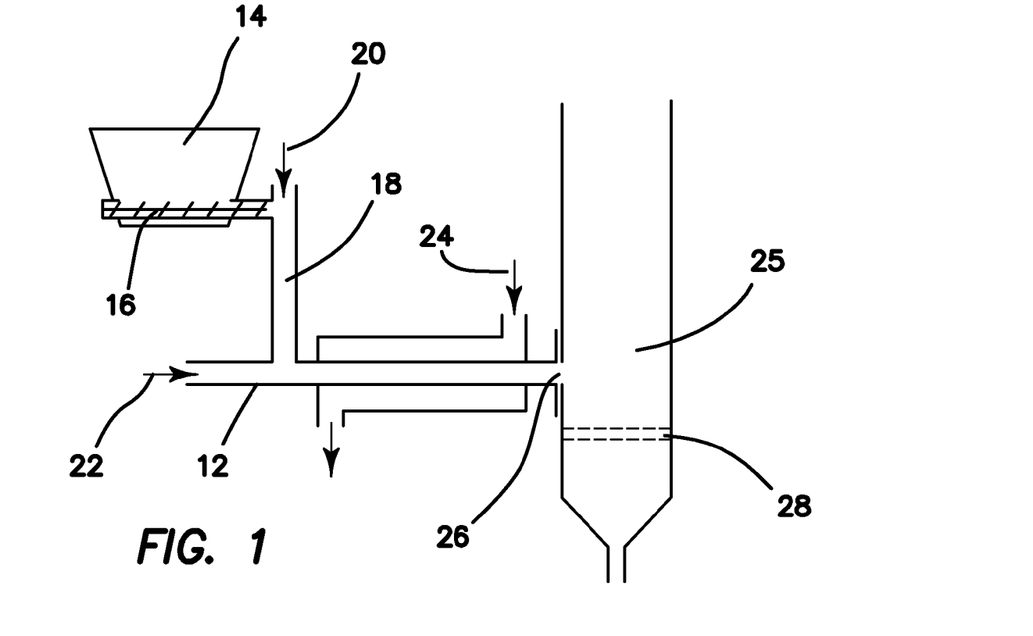
FIG. 1 shows a Gas-Jet Biomass Injector with a horizontal biomass feed tube.

FIG. 1 shows a system with horizontal biomass feed tube 12. During operation, biomass in hopper 14 is transported by optional screw feeder 16 into gas injector tube 18, through which a gas 20 assists transport of the biomass into horizontal biomass feed tube 12 which is assisted by gas flow 22. The gas compositions 20, 22 can be the same or different, and in some preferred embodiments comprises recycled CO and/or CO2. A coolant fluid 24 (such as cool water) can be used to cool the biomass to prevent reaction within the feeder tube 12. Biomass enters the fluidized bed reactor in a gas jet through feed port 26 at a point above distributor 28. In this illustration, the biomass feed tube is horizontal as it connects to the reactor and the injection gas flows into the biomass feed tube at a 90° angle. In preferred embodiments, to prevent heating of the biomass through a screw, there is no screw feeder within biomass feed tube 12 that is in proximity to feed port 26. Horizontal refers to horizontal with respect to gravity (that is, perpendicular to the force of gravity).

Figure 2:
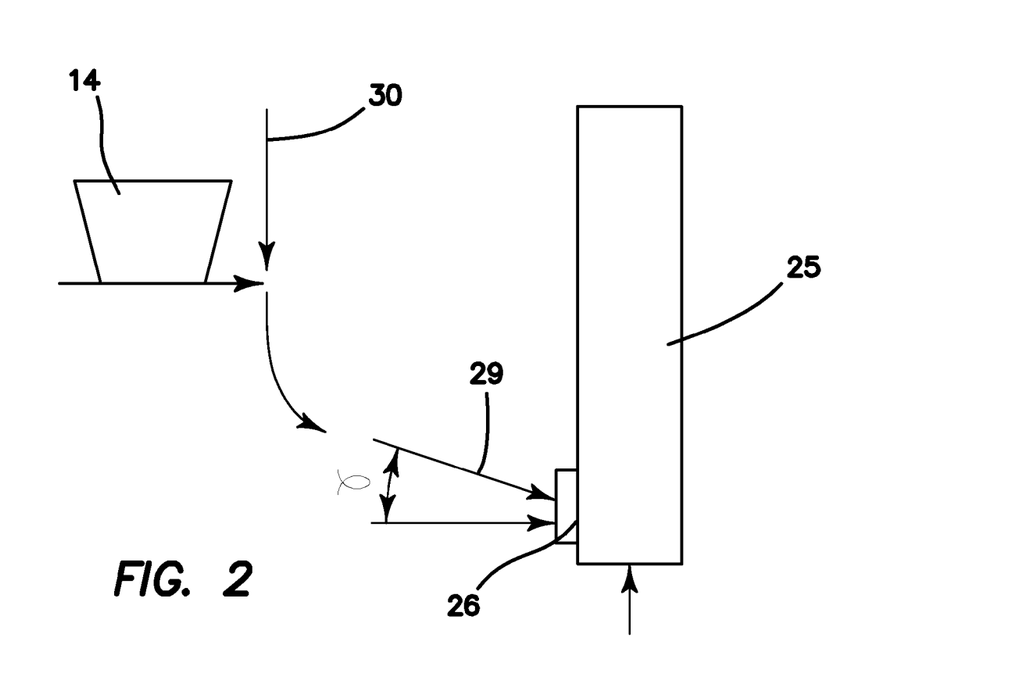
FIG. 2 shows an embodiment of a Gas-Jet Biomass Injector and reactor.

FIG. 2 illustrates the angle α (alpha) which is the angle from horizontal at which flow 29 through a feed tube travels immediately before passing through a feed port 26 into the fluidized bed reactor 25. In the embodiment of FIG. 2, there is only one injector gas flow 30. Note that the angle of the injector flow gas in upstream portions can be at a different angle than the gas jet at the inlet to the fluidized bed reactor.

Figure 3:
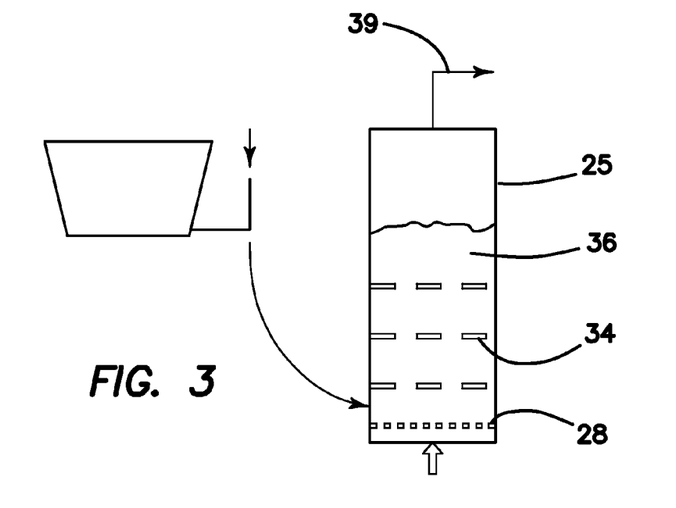
FIG. 3 shows an embodiment of a Gas-Jet Biomass Injector and reactor.

FIG. 3 illustrates an embodiment in which the fluidized bed reactor contains sieve trays 34 within the fluidized bed 36. Product stream 39 leaves through the top of the reactor where any suspended solids can be removed in a cyclone (not shown) and the nonsolid components within the product stream can be separated. Unless specified otherwise, references within this patent specification refers to the fluid product stream after solids removal and prior to separation of the nonsolid components.

Figure 4:
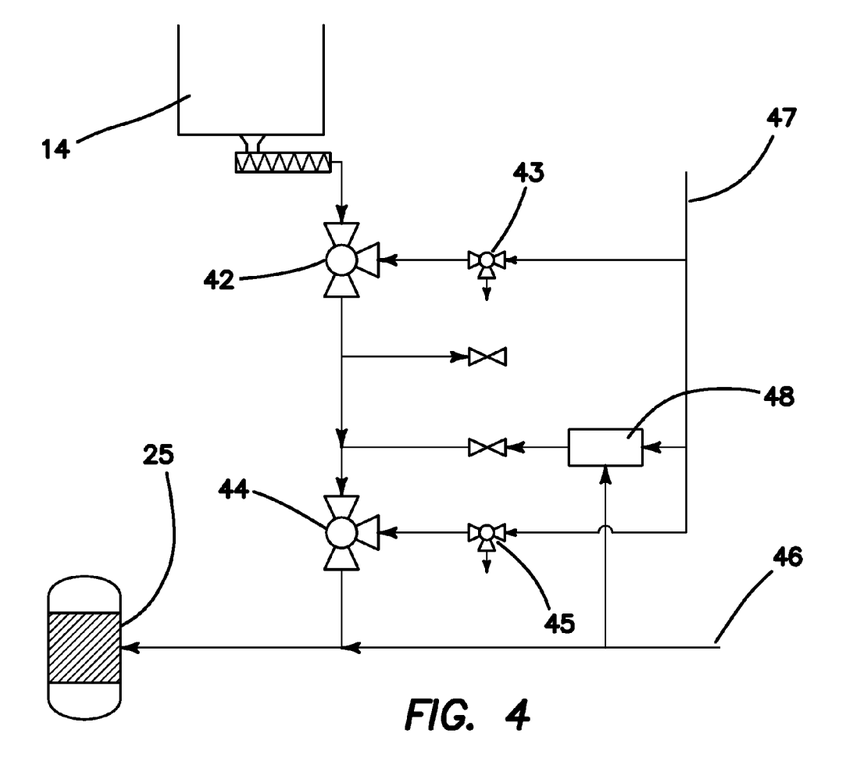
FIG. 4 shows a biomass injector assistance system for metering and injecting pulses of biomass into a reactor.

FIG. 4 illustrates a biomass injector airlock system constructed of pneumatic elastomeric pinch valves 42, 44 to maintain a large pressure difference between the solids hopper and reactor 25. Biomass feed is charged to feed hopper, 14, and transferred via a screw auger or other mechanical conveying device through open valve 42 into the airlock chamber, which is then sealed off by closing valve 42 and brought to a pressure above the reactor pressure. Pneumatic pinch valves 42 and 44 are opened or closed by admitting or releasing gas pressure through pressure- or electronically-activated valves 43 and 45 into the pneumatic sleeves of valves 42 and 44, respectively. The biomass feed can be metered by controlling the time during which valve 42 is kept in the open position. A gas reservoir is connected to the system via an inlet line 47 and pressure regulator 48 with a tap line on the reactor inlet used to charge the airlock chamber prior to releasing pulses of solids by opening valve 44 and injecting feed into the feed tube for injection into the reactor, 25, along with an optional carrier gas 46. An option shown in FIG. 4 is for the carrier gas 46 to supply the injection gas as well as the carrier gas.

A range of flow rates is possible that will be determined by the size, shape, density, and composition of the biomass particles, the size and shape of the reactor, the composition and pressure of the gas used as the injector gas, the amount and composition of the catalyst particles in the reactor, the desired mixing within the reactor, the desired feed rates of the biomass and catalyst, the presence of internal structures within the reactor, and other factors.

The gas injector conduits and ports that are used to introduce biomass into the reactor can be of various sizes depending on the size, shape and composition of the biomass particles, the size and shape of the reactor, the composition and pressure of the gas used as the injector gas, the amount and composition of the catalyst particles in the reactor, the desired mixing within the reactor, and other factors. The gas jet injector ports may be directed towards the center of the reactor, i.e., radial, or they may be at offset angles, e.g., tangential, in order to establish more desirable mixing patterns within the reactor. The gas jet injector ports may be aimed at any selected angle, such as horizontally (i.e., 0° with respect to gravity), or may be angled with respect to the horizontal such that the biomass flows upwards into the reactor, or at a downward angle into the reactor. In some embodiments the angle of the feed port is at least 15 degrees, at least 25 degrees, at least 35 degrees, at least 45 degrees, at least 50 degrees, or at least 62 degrees from the horizontal at the point at which it enters the reactor. Smooth, aerodynamically designed feed tubes are preferable to minimize clogging and minimize the fluid flow needed to move the biomass; rounded tubes are preferable and a minimum of sharp edges or corners is desired. A biomass hopper is situated above an inlet port so that gravity assists the movement of the biomass in the downward direction and inhibits clogging or sticking.

The Gas Jet feed system can be used to feed biomass feed into a reactor continuously, or, preferably, in short bursts or pulses. The timing of the short pulses of biomass feed can range from once every 0.2 seconds to one pulse every 60 seconds or longer, depending on the size and geometry of the reactor, biomass characteristics, and gas flow desired. The duration of flow during an individual pulse can range from 0.05 seconds to 30 seconds, depending on the size and geometry of the reactor, biomass characteristics, gas composition, and gas flow desired. An individual pulse can be of much shorter duration than the time between pulses or can be almost as long as the time between pulses. It is envisioned that when multiple gas jet feed ports are utilized the timing of the pulses could be synchronized to be simultaneous from multiple ports, or could be staggered with offsets in time, i.e., delay of the pulse from any one port with respect to the pules(s) from another particular port or ports. The optimization of pulse duration, timing, and synchronization can easily be conducted experimentally. Pulsed feed is expected to provide better mixing due to the more rapid linear velocity that can be achieved with the same total volume of gas when it is delivered in pulses.

The Gas Jet feed concept is expected to be advantageous for scaled up reactors as well, where keeping the biomass feed cool in auger type feed devices may be difficult. In a larger reactor there would likely be numerous injector ports arrayed around the walls, possibly at different heights and with different angles of injection. The rate of injection, i.e., the linear velocity of the gas and biomass, at different points could cover a wide range as well, since it would be useful to have some jets that inject the biomass far into the interior of the bed while some jets inject biomass to a lesser distance into the bed to get uniform mixing across the reactor. The injectors can terminate at the wall of the reactor or can extend inside of the reactor in some cases. Different injectors on the same reactor can extend inside the reactor to different depths depending on the distribution of biomass desired.

Internal mixing devices and heat exchange devices may be placed within the reactor. For example, a number of sieve trays, i.e., plates with numerous small holes that are set in horizontal positions, can be located at different heights within the fluid bed. These are an optional feature that may be useful to improve mixing and break up large bubbles, particularly in small reactors. A single layer of trays may be useful for larger reactors, or multiple layers may be preferred. Layers of sieve trays can inhibit the downward movement of the catalyst which may be advantageous to establish a 'flow' of catalyst from the top of the bed to the lower portion of the bed. In this manner, when catalyst is introduced at the top of the bed, the most active catalyst interacts with the most dilute mixture of pyrolysis product vapors, increasing the chances for reaction and the partially deactivated catalyst lower in the bed interacts with the more concentrated mixture of pyrolysis vapors. Sieve trays can establish a partial 'counter-current' flow of biomass in the upwards direction and catalyst in the downwards direction, maximizing catalytic conversion efficiency. In cases where the catalyst is introduced into the fluid bed at a lower portion through a dip leg or injector port, the sieve trays can insure that the freshly introduced catalyst interacts with freshly introduced biomass, thus setting up a co-current flow of biomass and catalyst through the bed. In that case the deactivated catalyst may be removed from the upper portion of the bed. Internal structures for fluidized beds are well known in the art as described in "Handbook of Fluidization and Fluid-Particle Systems" W—C Yang, ed., CRC Press, 2003, pages 171-199.

In some embodiments catalyst is mixed with the biomass for injection into the reactor. The catalyst can be any temperature, but preferably any catalyst mixed with biomass is at a temperature below the temperature of onset of pyrolysis of the biomass such that when it is mixed with the biomass the resulting pyrolysis is minimal. Additional catalyst can be introduced separately from the biomass and this portion of catalyst could be introduced at much different temperature, preferably a high temperature so as to supply heat needed for pyrolysis to the reactor. The relative amounts of catalyst introduced with the biomass or separately can vary over a wide range. As the catalyst introduced separately typically supplies heat for the system, typically a larger mass of catalyst is introduced to supply heat than is introduced with the biomass and, in some preferred embodiments, no catalyst is mixed with the biomass. The temperature of the reactor can be controlled, for example, by the amount of catalyst introduced separately, or its temperature, or the ratio of catalyst introduced by the two different feed streams.

The gas used for injection of the biomass can be any gas that is not detrimental to the process. Preferably the gas is a recycle gas from the process comprising CO, or $CO_2$, or both CO and $CO_2$. Preferably the gas could also contain other products such as olefins, hydrogen, or methane. Introduction of the olefin-containing recycle gas through the gas injector is expected to be preferable to introducing olefins through a distributor plate since the gas will be kept relatively cooler in the injector, thus minimizing olefin polymerization and coking that has been observed when olefins are introduced through the distributor. The gas jet stream could also contain steam, light hydrocarbons such as methane, ethane, propane, etc., and smaller amounts of other compounds. Inerts such as nitrogen or argon may also be included, but their content is preferably kept low to prohibit their buildup to high concentrations in a recycle system.

The gas flow rate of the gas jet fluid must allow the linear velocity of the gas in the gas jet to be high enough to rapidly transport the biomass into the fluid bed in order to prevent premature heating, plugging of the injector tube, and promote good mixing. The flow of fluid in the injector includes the carrier fluid that flows continuously through the injector inlet to minimize back-flow and the carrier flow that is introduced with the biomass when using a biomass metering system such as a biomass injector airlock system or other system. In some embodiments the linear velocity of the carrier fluid in the biomass injector port is at least 25 cm/sec, 50 cm/sec, 100 cm/sec, 150 cm/sec, or at least 200 cm/sec, or at least 225 cm/sec, or at least 250 cm/sec, or at least 300 cm/sec or from 25 cm/sec to 10,000 cm/sec, or from 50 to 7,000 cm/sec, or from 100 to 5,000 cm/sec, or from 200 to 5,000 cm/sec, or from 225 to 5,000 cm/sec.

The required linear velocity of the gas in the gas jet in order to prevent clogging of the feed tube and inject the biomass particles into the bed will depend on the size, shape, density, and other characteristics of the biomass particles. Smaller particles, or more spherical particles, or more dense particles flow more easily and require lower flow velocity to prevent clogging. Particles with a bulk density of at least 0.10 g/cc can more easily be transported, preferably at least 0.25 g/cc, most preferably at least 0.5 g/cc. The bulk density is measured by filling a tared measured volumetric container with material, loosely packed and settled only by mild agitation, and weighing it to determine the mass of material that fills the volume; the density is simply the mass divided by the volume. Particles can have average diameters from 1 micron to 20,000 microns, preferably 50 microns to 5,000 microns, most preferably 250 microns to 2,000 microns. Particles that are not smooth or that have higher moisture contents tend to flow less easily and clog more readily and may require higher gas velocities for injection into the reactor. Pretreatment of the biomass by drying, grinding, chopping, etc can be used to modify the particle characteristics. In general procedures that make the particles flow more readily such as grinding to very small particle size (<250 microns diameter) and drying to very low moisture levels add processing steps and costs to the overall process.

The balance between the flow rates and volumes introduced through the Gas Jet Feed Ports and the Fluidization Feed Port could vary over a wide range. In some embodiments, the ratio of gas flow rate injected with the biomass to the gas flow rate introduced through the fluidization port is less than 0.1, less than 0.25, less than 0.5, less than 1, less than 2, less than 3, less than 5, or less than 10, or between 0.001 and 10, or between 0.01 and 5, or between 0.1 and 2. The preferred levels of ratio of the flow rate at the injection port (also known as feed port) to flow rate through the fluidization port applies to the case where there is a single feed port and a single fluidization port; and it also applies in the case of multiple ports, in which the summed flows of the feed port(s) are divided by the sum of flow through the fluidization port(s). Alternatively, much lower rates of fluidization flow may be possible with the use of gas jet injection ports, or it may be eliminated altogether. Some fluidization flow through the distributor or otherwise introduced into the lower portion of the reactor is preferred to keep the more dense solids from collecting on the bottom of the reactor. In some embodiments the distributor plate is absent and the fluidization fluid is introduced via a distribution system or sparger located within the lower portion of the fluid bed. Gas distributors and plenum designs for fluidized beds are well known in the art as described in "Handbook of Fluidization and Fluid-Particle Systems" W-C Yang, ed., CRC Press, 2003, pages 155-170.

The balance between the gas flow temperatures and volumes introduced through the Gas Jet Feed Ports and the Fluidization Feed Port are also an important factor in improving production of useful products such as aromatics, olefins, heavy hydrocarbons, or some combination of these. A normalized feed temperature can be defined that is a weighted average of the temperatures of the gas feed streams and can be calculated as [(flow rate of injected feed gas*temperature of injected feed gas)+(fluidization gas flow rate*fluidization gas temperature)]/(injected gas flow rate+fluidization gas flow rate). This definition assumes rapid mixing of the injected and fluidization gases, typically in the volume that is immediately above the distributor. It is believed that normalized feed temperatures below the preferred range will result in greater char and lesser aromatics, while normalized feed temperatures above the preferred range will result in more CO and coke. Normalized feed temperatures can range from 50 to 700° C., or 75 to 650° C. or preferably from 100 to 600° C. depending on the biomass feed composition, gas feed composition, catalyst, pressure, and other process parameters.

The reactor can be operated in either batch mode wherein the catalyst is charged before the reaction is started, or in continuous mode, wherein catalyst is added and removed continuously. During continuous operation both catalyst and biomass are fed to the reactor. The mass ratio of the catalyst:biomass feeds can, in some preferred embodiments, range from 0.3 to 20, or from 1 to 10, or from 2 to 6, or from 2.5 to 4. In some preferred embodiments, the ratio is 10 or more; for example, in the range of 10 to 40 or 10 to 20.

The space velocity of the CFP process, defined as the rate of biomass feed divided by the mass of catalyst in the reactor, typically expressed in inverse time units, can range from $0.05\ hr^{-1}$ to $20\ hr^{-1}$, or from $0.1\ hr^{-1}$ to $10\ hr^{-1}$, or from $0.2\ hr^{-1}$ to $5\ hr^{-1}$, or from $0.3\ hr^{-1}$ to $2\ hr^{-1}$. In some embodiments the space velocity is at least 0.1, at least 0.2, at least 0.3, at least 0.4, at least 0.5, at least 0.8, or at least $1.0\ hr^{-1}$. The conditions of the CFP process can be any of those summarized in U.S. Pat. No. 8,277,643, incorporated herein by reference.

Catalyst components useful in the context of this invention can be selected from any catalyst known in the art, or as would be understood by those skilled in the art made aware of this invention. Functionally, catalysts may be limited only by the capability of any such material to promote and/or effect dehydration, dehydrogenation, isomerization, hydrogen transfer, aromatization, decarbonylation, decarboxylation, aldol condensation and/or any other reaction or process associated with or related to the pyrolysis of a hydrocarbonaceous material. Catalyst components can be considered acidic, neutral or basic, as would be understood by those skilled in the art. Alternatively, alone or in conjunction with such and other considerations, catalysts can be selected according to pore size (e.g., mesoporous and pore sizes typically associated with zeolites), e.g., average pore sizes of less than about 100 Angstroms, less than about 50 Angstroms, less than about 20 Angstroms, less than about 10 Angstroms, less than about 5 Angstroms, or smaller, although pores smaller than the kinetic diameter of aromatic rings are significantly less desirable. In some embodiments, catalysts with average pore sizes of from about 5 Angstroms to about 100 Angstroms may be used. In some embodiments, catalysts with average pore sizes of between about 5.5 Angstroms and about 6.5 Angstroms, or between about 5.9 Angstroms and about 6.3 Angstroms may be used. In some cases, catalysts with average pore sizes of between about 7 Angstroms and about 8 Angstroms, or between about 7.2 Angstroms and about 7.8 Angstroms may be used. Catalysts may have bimodal or multimodal distributions of pores such that there are significant numbers of pores of a small size and a significant number of pores of a larger size or sizes. Preferred catalysts include natural or synthetic ferrierite, zeolite Y, zeolite beta, mordenite, MCM-22, ZSM-5, ZSM-12, ZSM-23, ZSM-35, ZSM-57, SUZ-4, EU-1, ZSM-11, (S)AlPO-31, SSZ-23. A particularly preferred catalyst is ZSM-5, or one that comprises ZSM-5. In some embodiments, the catalyst may comprise a metal and/or a metal oxide. Suitable metals and/or oxides include, for example, nickel, platinum, vanadium, palladium, chromium, manganese, iron, cobalt, zinc, copper, chromium, gallium, any of the rare earth metals, ie elements 57-71 of the Periodic Table, or any of their oxides or any combinations of these.

EXAMPLES

Comparative Example 1

Catalytic fast pyrolysis (CFP) of pinewood was conducted in a fluidized bed reactor. The fluidized bed reactor was 2 inches outer diameter (OD) and 24 inches in height and was made of 316 stainless steel. Inside the reactor, the catalyst bed was supported by a distributor plate made of 316 stainless steel plate with 1/16 inch circular openings. The reactor, shown schematically in FIG. 1, was fitted with a screw auger of 0.625 inch OD, 0.39 inch inner diameter (ID) positioned horizontally, through which the biomass was fed by rotation of the auger.

The reactor was loaded with 102 g of 2% Ga/ZSM5 catalyst prior to the experiment and the catalyst was calcined in-situ in air at the flow rate of 3.0 SLPM for 2 hours at 580° C. The pine saw dust (PSD) was ground and sieved to 0.25-2 mm particle size. About 300 grams of pine saw dust was weighed and loaded into the hopper system. The reactor was purged with a flow of $N_2$ at 3.0 SLPM for 30 minutes prior to starting the experiment.

The reactor was heated to 580° C. and the fluidization gas feeding tube was heated to approximately 500° C. Biomass flow rate was accurately controlled by an augur inside the hopper that delivers the biomass to the feed tube. The solid biomass (pinewood) was introduced into the reactor from a side feeding tube with $N_2$ flow. Gas flow rate through the biomass screw auger feed tube was 0.5 SLPM giving a calculated linear velocity at 25° C. of 11.8 cm/second at the entry to the reactor. The biomass feed rate was adjusted to about 1.0 g/min. The feeding tube enters the reactor approximately 1 inch above the distributor plate. During reaction, 1.0 SLPM of $N_2$ was passed into the reactor through the distributor plate to fluidize the catalyst in addition to the feeding tube $N_2$ flow.

The reactor effluent exited the reactor from the top through a heated cyclone (350° C.) to remove solid particles, including small catalyst and char. The effluent exiting the cyclone flowed into a product collection system that included two bubblers and three condensers. The bubblers were placed in an ice water bath and charged with 150 ml of isopropanol inside as solvent; the three condensers contained no solvent and were placed inside a Dry Ice/isopropanol bath. The uncondensed gas phase products that exited the last condenser were collected in gas bags. The reaction time was typically 30 min and two gas bag samples were taken at 15 and 30 minutes time on stream after initiating the feed of biomass. After each bag was taken, the total gas flow rate was measured with a bubble flow meter; at least 4 measurements were made and the average was used for performance calculations. The gas bags samples were analyzed by injection into a Shimadzu GC 2010 that had been calibrated with analytical standard gas mixtures.

The contents of each of the two bubblers were collected. The contents of the three condensers were weighed and combined into a single sample. The condensers were rinsed with isopropanol to produce a fourth sample. All 4 liquid volumes were measured and weights determined. Liquid samples were all analyzed by injection into a Shimadzu GC 2014.

The carbon yield of aromatics and olefins was determined to be 2.01%.

Comparative Example 2

The experiment was repeated with a biomass feed auger flow rate of 1.0 SLPM, which provides a linear velocity of 24 cm/second in the horizontal biomass feed tube at the entry to the reactor. A fresh sample of 100 g of catalyst was charged to the reactor. The biomass feed rate was adjusted to 0.78 g/min.

The carbon yield of aromatics and olefins was determined to be 9.55%.

Poor mixing, premature heating of the biomass, and inadequate transport of the biomass into the catalytic fluid bed were observed as evidenced by the large amount of char formed and the low yields of aromatics and olefins. The auger and tube became hot and the metal became discolored.

Gas Jet Experiments

The screw auger was removed from the auger feed system, leaving the empty auger tube in place to serve as the conduit for biomass feed to the reactor. An experiment was attempted with biomass fed through the auger tube (no screw) with 2 SLPM gas flow through the auger tube and 1 SLPM fluidization gas fed through the distributor. The empty auger tube entered the reactor horizontally. Other conditions were as in Comparative Experiment 1. Biomass accumulated in the auger tube and eventually clogged the transfer line from the biomass hopper outlet to the auger tube due to the low gas velocity and horizontal position of the feed tube. The feed of biomass stopped and the reactor was shut down.

A cold flow fluid bed reactor was assembled that included a clear polycarbonate tube to permit observation of the fluidization within the reactor. The horizontal tube shown in FIG. 1 was not effective at transporting the biomass into the reactor in cold flow tests. Much of the biomass was observed to sit in the horizontal transfer tube.

It was determined experimentally in the cold flow device, that with a 0.25 inch OD (ID=0.2 inch) gas-jet injection tube and an entry angle of about 26 degrees from the horizontal the flow rate of the carrier gas needed to be at least about 2.5 SLPM to prevent clogging with biomass particles ~2 mm in size, with a biomass feed rate of 0.5-1.0 g/minute. Lower carrier gas flow rates clogged the tube. The linear velocity of the injector gas was calculated to be ~224 cm/second at 25° C. in the injector tube.

Examples 3 Through 12

The biomass transfer tube was replaced by a curved 0.25-inch OD SS-316 tube extending from the feed hopper to the biomass inlet port. The feed hopper was situated above and to the side of the reactor. The angle of entry of the feed tube into the fluid bed was 26 degrees from the horizontal, as shown in FIG. 2. A series of sieve trays made of perforated 316 stainless steel with one-eighth (0.125) inch openings and 42% open area were installed inside the reactor, as shown in FIG. 3. There were six sieve trays attached to a central, threaded rod and there was a 1-inch spacing between the sieve trays.

A series of experiments was conducted with the conditions as summarized in Table 1.

As shown in Table 1 (for example, compare examples 9 and 10 with 11 and 12), the ratio of injection flow rate (which is measured at the interface between the injection tube and the reactor, in other words, at the solids inlet to the reactor) to fluidization flow rate (measured at the fluidization gas inlet to the fluidized bed) was surprisingly found to show better results (higher aromatics, higher aromatics and olefins, and higher benzene and toluene) at a ratio of about 0.1 or more, and in some embodiments this ratio is selected to be in the range of 0.05 to 5; in some embodiments 0.1 to 5; and in some embodiments 0.1 to 2.

The Nominal Linear Velocity of the feed gas at the entry to the reactor was calculated by dividing the volumetric flow of gas in the gas jet at standard conditions (25° C., 1 atm) by the cross sectional area of the inlet port.

It was also surprisingly discovered that, regardless of (that is, independent of) the temperature in the reactor bed, a relatively high temperature of the fluidization gas at the inlet to the fluidized bed reactor resulted in significantly superior results. Preferably, the temperature of the fluidization gas at the inlet to the fluidized bed is about 500° C. or more, preferably about 550° C. or more, in some embodiments at least 575° C. The upper limit of this temperature parameter has not yet been determined but could be determined with routine experimentation. In some embodiments, the upper limit (in combination with any of the limits mentioned above) is 900° C. or less, in some embodiments 800° C. or less, in some embodiments 700° C. or less, in some embodiments 650° C. or less. Generally, a high yield of the sum of aromatics and olefins is desirable; however, in cases in which very low yields of olefins (that is, a high ratio of aromatics to olefins) is desired, then it may be desirable to operate with a temperature of the fluidization gas at the inlet to the fluidized bed of about 400° C. or less, in some embodiments in the range of 0 to about 300° C., although the low temperature was also found to be associated with a relatively high yield of undesirable polycyclic aromatics.

Another surprising discovery was that superior results can be obtained by controlling the normalized feed temperature in a fluidized bed reactor. The superior results can be obtained using normalized feed temperatures between 100 and 650° C., preferably between 200 and 600° C., still more preferably between 300 and 560° C. This can be achieved, in preferred embodiments, by controlling the temperatures and/or flow rates a mixture of fluidization gas and injection gas flow carrying biomass into the region below the distributor in a fluidized bed reactor. The Normalized feed temperature is defined as (flow rate of injected feed gas*temperature of injected feed gas)+(fluidization gas flow rate*fluidization gas temperature)/(injected gas flow rate+fluidization gas flow rate). This definition assumes rapid mixing of the injected and fluidization gases, typically in the volume that is immediately above the distributor. It is believed that normalized feed temperatures below the preferred range will result in greater char and lesser aromatics, while normalized feed temperatures above the preferred range will result in more CO and coke.

Example 13

The reactor of Example 12 that utilized a gas jet injector feed in a 2-inch diameter nominal pipe reactor was charged with 158 g of Catalyst A, a commercially obtained fluid bed ZSM-5 catalyst containing approximately 40 weight % crystalline ZSM-5 in an inert binder. The feed gas flow rate, biomass feed rate, and temperatures were adjusted as shown in Table 2. Ground hardwood pellets containing 46.99% carbon and 6.16% hydrogen were used as the biomass feed. The results show that a high yield of aromatics and olefins can be achieved with an injection velocity of 69 cm/sec and a normalized feed temperature of 150° C. when a gas jet biomass feed system is used.

Example 14

The reactor of Example 13 was charged with 161 g of Catalyst A and the experiment was repeated. The results demonstrate that the process is highly reproducible using a gas jet injector system.

Example 15

A reactor consisting of a 4 inch diameter 316 stainless steel pipe with a free board height of 30 inches was constructed. The top of the freeboard expands to 6 inches to suppress entrainment of catalyst particles in the exit gas stream. The catalyst bed is supported by a distributor made from a 316 stainless steel wire mesh (50×250 mesh). The bottom of the reactor below the distributor plate serves as a gas preheater zone. The catalyst is fluidized with nitrogen controlled by a mass flow controller. The reactor is externally heated with a four-zone electric furnace to minimize the temperature gradient across the reactor. All zones were maintained at reaction temperature. The temperatures inside the reactor were measured by K-type thermocouples inserted to a penetration depth of 1 cm.

A biomass hopper and biomass injection assistance system as shown in FIG. 4 was fitted to the reactor. The biomass injection assistance system consists of two pinch valves and an intermediate chamber that allows for isolating the biomass hopper from the reactor pressure. With the auger in the biomass hopper running, biomass falls through the top pinch valve (open), into the intermediate chamber, above the bottom pinch valve (closed). The top valve closes, the chamber is pressurized to just above the reactor pressure, the bottom valve opens, and biomass is injected into the reactor with assistance of carrier nitrogen.

The reactor was charged with 538 g of catalyst B, a commercially obtained fluid bed catalyst containing approximately 50 wt % ZSM-5. The hopper was charged with 200 g of ground hardwood pellets and the reactor was brought to reaction temperature with a flow of $N_2$. The biomass feed system was started with biomass pulses spaced approximately 2.1 seconds apart so that each pulse delivered approximately 0.2 g of biomass.

The results of Example 15 show that high yields of aromatics and olefins can be obtained with a pulsed biomass injector system.

Example 16

A pilot unit was constructed that included a reactor with internal diameter of 11.38 inches and height of 18 inches. The distributor consists of a wire mesh distributor plate. A feed hopper with a metering auger for delivering biomass and a biomass injection assistance system to pulse the biomass into the reactor were fitted to the reactor. The feed tube where the biomass entered the reactor made a 60 degree angle with the horizontal.

The reactor was charged with 4103 g of Catalyst A and the system was heated to reaction temperature. The biomass hopper was charged with about 3 kg of ground hardwood pellets (49.9% C, 5.9% H) and the experiment was started. Biomass was fed for 30 minutes at a rate of 43.2 g/min, and then the reactor was flushed an additional 10 minutes with nitrogen to collect materials remaining in the reactor. The outlet of the reactor was passed through a knock-out pot maintained at about 0° C., and two isopropanol bubblers maintained at 0° C., and a condenser maintained at −78° C. The contents of the collection vessels were combined for the liquid product analysis. A sample of the gases that exited the condenser was injected into a gas GC for analysis. A sample of the used catalyst and char was removed, dried at 120° C., separated into fine (catalyst) and larger (char) particles, and analyzed for carbon content by calcining in air at 600° C.

The results of Example 16 summarized in Table 2 demonstrate that the pulsed feed of biomass provides a high yield of aromatics and olefins in large reactors with larger diameters. The results demonstrate that the CFP process can be operated with a very low biomass feed gas flow to fluidization gas flow ratio (0.05).

Example 17

The procedures of Example 16 were repeated with a fresh charge of 4197 g of Catalyst A. The results summarized in Table 2 demonstrate that the process is reproducible with the very low ratio of biomass feed gas flow to fluidization gas flow.

Example 18

The procedures of Example 16 were repeated with a fresh charge of 5200 g of catalyst A but with lower biomass flow rate and higher ratio of biomass feed gas flow to fluidization gas flow. Under these conditions the yields of aromatics and olefins were less than in Examples 16 and 17, but remained far above what had been obtained with an auger feed system that was directly connected to the reactor as in Examples 1 and 2.

Surprisingly, we discovered that the gas-injected reaction with a relatively lower biomass feed rate resulted in lower aromatic yield (compare Examples 17 and 18). Thus showing that the use of gas injection results in better yield and a more efficient use of catalyst.

Example 19

The procedure of Example 18 was repeated with 5162 g of Catalyst B in place of Catalyst A. The results of Example 19 show that different catalysts can be used in the CFP process with gas jet injection to achieve high yields of aromatics and olefins. The results of Example 19 demonstrate that the choice of catalyst and operating conditions to get high yields are not the same for all catalysts, ie the conditions must be matched to the catalyst.

Example 20

In this example the apparatus of Example 16 was additionally fitted with a catalyst hopper for continuous addition of catalyst to the process during operation. The catalyst feed system consists of a ⅛" thick 316SS pressurized vessel providing catalyst by gravity via a rotary ball valve positioned above the reactor of working capacity 28.3 liters fitted with internal electric cable-style heater for pre-heating catalyst during continuous operation and a nitrogen pressurization line to maintain inert headspace and provide assist pressure to continuous catalyst feed. The catalyst hopper could be refilled during the experiment as needed.

The catalyst hopper was charged with about 40 kg of catalyst B and the reactor was charged with 4800 g of catalyst B. The biomass hopper was charged with 3 kg of ground hardwood chips. The reactor was heated to reaction temperature under nitrogen and the feeds were initiated as shown in Table 2. Catalyst feed rate was 95 g/minute, biomass feed rate was 30.9 g/minute, and the ratio was 3.1. The experiment was continued for 4 hours; the results of the first hour of operation are collected in Table 2.

The results of Example 20 show that a high yield of aromatics and olefins can be obtained in a large reactor under conditions of continuous catalyst and biomass feed using pulsed jet injection to feed the biomass.

Example 21

The experiment of Example 20 was repeated with a fresh charge of Catalyst B. The feed rate of catalyst B was increased relative to Example 20 to give a catalyst/biomass feed rate of 3.9.

Results summarized in Table 2 show that by adjusting the catalyst/biomass feed ratio the yield of aromatics can be improved using a pulsed gas jet injector to feed the biomass. The results show that the pulsed gas jet injector can be used to successfully scale up the CFP process with aromatics yields as high as those observed in much smaller (2-inch OD) reactors (Examples 13-14).

Comparing the results of Examples 14, 15 and 19-22 to Examples 16, 17, and 18 shows that the yield of aromatics is generally higher at the higher injection velocities used in Examples 14, 15, and 19-22 than with the lower injection velocities used in Examples 16-18.

TABLE 1

Catalytic Fast Pyrolysis results in 2-inch (5 cm) OD Fluid Bed Reactor.

| Experiment Number | 1 | 2 | 3 | 4 | 5 | 6 | 7 | 8 | 9 | 10 | 11 | 12 |
|---|---|---|---|---|---|---|---|---|---|---|---|---|
|  | Auger | Auger | Gas-Jet | Gas-Jet | Gas-Jet | Gas-Jet | Gas-Jet | Gas-Jet | Gas-Jet | Gas-Jet | Gas-Jet | Gas-Jet |
| Fluidization Flow Rate, SLPM | 1.0 | 1.0 | 1.5 | 2.5 | 2.5 | 0.5 | 0.5 | 0.5 | 1.5 | 1.5 | 3.0 | 3.0 |
| Biomass Injection Flow, SLPM | 0.5 | 1.0 | 2.5 | 2.5 | 2.5 | 2.5 | 2.5 | 2.5 | 3.0 | 3.0 | 1.5 | 1.5 |
| Run Time, min | 30 | 30 | 60 | 45 | 75 | 29 | 30 | 45 | 30 | 32 | 144 | 240 |
| Catalyst charged, g | 102.0 | 100.0 | 149.8 | 149.8 | 150.1 | 150.1 | 248.5 | 350.2 | 150.5 | 150.0 | 149.6 | 150.4 |
| Biomass | PSD | PSD | PSD | PSD | PSD | PSD | PSD | PSD | Newsprint | Newsprint | Newsprint | Newsprint |
| Biomass Flow Rate, g/min | 1.03 | 0.78 | 0.76 | 0.71 | 0.78 | 0.66 | 0.62 | 0.62 | 0.90 | 1.26 | 0.75 | 0.77 |
| Fluid Bed Temp, ° C. | 580 | 580 | 550 | 573 | 558 | 570 | 580 | 580 | 580 | 580 | 583 | 583 |
| Fluidization Gas Inlet Temp, ° C. |  |  | 355 | 342 | 236 | 585 | 609 | 609 | 577 | 577 | 577 | 577 |
| Normalized Feed Temp, ° C. |  |  | 149 | 184 | 131 | 118 | 122 | 122 | 209 | 209 | 393 | 393 |
| Feed angle from horizontal | Horizontal | Horizontal | 26 deg | 26 deg | 26 deg | 26 deg | 26 deg | 26 deg | 26 deg | 26 deg | 26 deg | 26 deg |
| Inlet Tube diameter, ID cm | 1.0 | 1.0 | 0.5 | 0.5 | 0.5 | 0.5 | 0.5 | 0.5 | 0.5 | 0.5 | 0.5 | 0.5 |
| Linear velocity of gas jet, cm/sec | 11.8 | 23.6 | 224 | 224 | 224 | 224 | 224 | 224 | 269 | 269 | 135 | 135 |
| Flow ratio Gas jet/Distributor | 0.5 | 1 | 1.7 | 1 | 1 | 5 | 5 | 5 | 2 | 2 | 0.5 | 0.5 |
| Product Yields (Carbon %) |  |  |  |  |  |  |  |  |  |  |  |  |
| Aromatics | 0.9% | 8.8% | 21.3% | 18.1% | 19.4% | 8.3% | 14.2% | 16.0% | 21.1% | 22.4% | 18.6% | 18.5% |
| Olefins | 1.1% | 0.7% | 1.9% | 2.1% | 2.0% | 6.8% | 10.6% | 10.9% | 6.2% | 7.8% | 5.6% | 6.1% |
| Aromatics + Olefins | 2.0% | 9.6% | 23.2% | 20.3% | 21.4% | 15.2% | 24.8% | 26.9% | 27.3% | 30.2% | 24.2% | 24.6% |
| CO | 13.5% | 6.5% | 14.6% | 14.9% | 13.9% | 14.3% | 22.1% | 27.6% | 19.9% | 17.5% | 15.0% | 17.1% |
| Methane | 9.2% | 6.9% | 2.4% | 2.5% | 1.1% | 3.2% | 4.3% | 3.8% | 2.7% | 2.4% | 1.7% | 2.1% |
| CO2 | 3.2% | 3.3% | 4.2% | 3.9% | 3.9% | 4.4% | 6.5% | 8.1% | 6.7% | 5.8% | 4.6% | 6.0% |
| Coke |  |  | 11.7% | na | 9.8% | 3.9% | 12.9% | 14.0% | na | na | na | na |
| Char |  |  | 5.8% | na | 11.4% | 6.8% | 3.1% | 6.1% | na | na | na | na |
| Total Identified Products | 27.9% | 26.2% | 62.0% | 41.5% | 61.5% | 47.8% | 73.8% | 86.5% | 56.6% | 55.9% | 45.4% | 49.7% |

PSD = Pine Sawdust

TABLE 2

Fluid Bed CFP experiments

| Experiment | 13 | 14 | 15 | 16 | 17 | 18 | 19 | 20 | 21 | 22 |
|---|---|---|---|---|---|---|---|---|---|---|
| Catalyst Feed Type | Batch | Batch | Batch | Batch | Batch | Batch | Batch | Continuous | Continuous | Continuous |
| Reactor diameter, OD, inches | 2 | 2 | 4 | 12 | 12 | 12 | 12 | 12 | 12 | 12 |
| Duration, hours | 0.5 | 0.5 | 0.5 | 0.5 | 0.5 | 0.5 | 0.5 | 1 | 1 | 1 |
| Catalyst | A | A | B | A | A | A | B | B | B | B |

TABLE 2-continued

Fluid Bed CFP experiments

| Experiment | 13 | 14 | 15 | 16 | 17 | 18 | 19 | 20 | 21 | 22 |
|---|---|---|---|---|---|---|---|---|---|---|
| Catalyst charged, g | 158 | 161 | 538 | 4103 | 4197 | 5200 | 5162 | 4800 | 4800 | 4700 |
| Biomass Feedrate, g/min | 1.81 | 1.88 | 5.50 | 43.3 | 43.2 | 34.3 | 34.4 | 30.9 | 31.6 | 31.4 |
| Biomass Feed | Continuous | Continuous | Pulsed | Pulsed | Pulsed | Pulsed | Pulsed | Pulsed | Pulsed | Pulsed |
| Catalyst feed rate, g/min | — | — | — | — | — | — | — | 95 | 123 | 126 |
| Catalyst to Biomass feed ratio | — | — | — | — | — | — | — | 3.1 | 3.9 | 4.0 |
| WHSV, hr-1 | 0.90 | 0.90 | 0.66 | 0.63 | 0.62 | 0.40 | 0.40 | 0.39 | 0.40 | 0.39 |
| Reactor Temperature, C. | 575 | 575 | 575 | 575 | 575 | 575 | 575 | 558 | 544 | 558 |
| Fluidization gas, SLPM | 1.5 | 1.5 | 2.3 | 110 | 110 | 68 | 68 | 68 | 68 | 68 |
| Fluidization gas Temp, ° C., (est.) | 400 | 400 | 400 | 560 | 560 | 560 | 560 | 543 | 529 | 543 |
| Feed carrier gas, SLPM | 3.0 | 3.0 | 3.2 | 5.0 | 5.0 | 5.0 | 8.0 | 8.0 | 8.0 | 8.0 |
| Feed/Fluidization Gas flow ratio | 2.0 | 2.0 | 1.4 | 0.05 | 0.05 | 0.07 | 0.12 | 0.12 | 0.12 | 0.12 |
| Normalized feed Temp, ° C. | 150 | 150 | 182 | 537 | 537 | 504 | 504 | 488 | 476 | 488 |
| Inlet tube diameter, ID, cm | 0.5 | 0.5 | 1.0 | 1.9 | 1.9 | 1.9 | 1.9 | 1.9 | 1.9 | 1.9 |
| Injection velocity, cm/sec | 278 | 278 | 82 | 31 | 31 | 31 | 50 | 50 | 50 | 50 |
| Carbon Yields, % | | | | | | | | | | |
| Aromatics | 20.5 | 20.3 | 19.6 | 18.2 | 16.2 | 11.5 | 18.5 | 17.1 | 20.7 | 20.1 |
| Olefins | 9.5 | 9.8 | 6.9 | 5.6 | 5.3 | 7.6 | 8.1 | 4.8 | 4.9 | 5.7 |
| CO | 18.9 | 19.3 | 19.3 | 18.1 | 22.2 | 23.2 | 24.9 | 16.0 | 15.9 | 17.9 |
| Methane | 3.4 | 4.6 | 3.1 | 2.4 | 3.1 | 3.2 | 3.0 | 1.4 | 1.6 | 1.7 |
| CO2 | 4.5 | 4.7 | 4.0 | 4.6 | 5.5 | 5.3 | 6.2 | 4.3 | 4.1 | 4.5 |
| Parafins, alkynes, furans | 0.8 | 1.2 | 0.0 | 0.6 | 0.7 | 1.0 | 0.7 | 0.5 | 0.5 | 0.6 |
| unknowns | 2.4 | 3.0 | 3.7 | 10.2 | 9.8 | 2.4 | 5.6 | 7.7 | 7.4 | 6.8 |
| Coke & Char | 30.0 | 25.2 | 31.1 | 36.0 | 40.7 | 38.3 | 34.9 | 43.6 | 41.9 | 36.8 |
| Total | 90.0 | 88.2 | 87.6 | 95.6 | 103.5 | 92.4 | 101.6 | 95.4 | 96.8 | 94.1 |

CONCLUSIONS

The geometry of the injector port, linear velocity of the injector gas, and/or the conditions of the gas jet can be important factors in achieving biomass introduction, good mixing in the reactor, and high yields of aromatics and olefins.

In any of the claims or other descriptions, it should be recognized that the invention includes apparatus, methods and systems. A system includes both apparatus and conditions within the apparatus, for example fluid flows and temperatures. In any of the claims, the term "apparatus" can be replaced by the term "system."

What is claimed:

1. A method for producing one or more fluid hydrocarbon products from a solid hydrocarbonaceous material in a fluidized bed reactor having a fluidization port and one or more feed ports, comprising:
    feeding a first reactant comprising the solid hydrocarbonaceous material to a fluidized bed reactor by injecting the solid hydrocarbonaceous material into a gas jet comprising a carrier fluid to produce a gas jet comprising the solid hydrocarbonaceous material and the carrier fluid, wherein the solid hydrocarbonaceous material is injected into the gas jet in discontinuous pulses;
    passing the gas jet comprising the solid hydrocarbonaceous material and the carrier fluid to the fluidized bed reactor through the one or more feed ports;
    introducing a gas through the fluidization port into the fluidized bed reactor;
    pyrolyzing at least a portion of the solid hydrocarbonaceous material in the fluidized bed reactor under conditions sufficient to produce one or more pyrolysis products;
    catalytically reacting at least a portion of the one or more pyrolysis products under reaction conditions sufficient to produce the one or more fluid hydrocarbon products;
    wherein the one or more feed ports have an angle that is downward with respect to gravity and that is at least 15 degrees from the horizontal at the point at which the one or more feed ports enters the fluidized bed reactor; and further comprising one or more of the following characteristics: wherein the carrier fluid flows through the one or more feed ports with a linear velocity of at least 25 cm/sec; or wherein the gas jet comprising the solid hydrocarbonaceous material and the carrier fluid are fed through the one or more feed ports into the fluidized bed reactor with a ratio of carrier fluid flow rate through the one or more feed ports to gas flow rate through the fluidization port of between 0.001 and 10.

2. The method of claim 1 wherein the carrier fluid flows through the one or more feed ports with a linear velocity of at least 25 cm/sec to 10,000 cm/sec.

3. The method of claim 1 wherein the ratio of carrier fluid flow rate through the one or more feed ports to the gas flow rate through the fluidization port is between 0.001 and 10.

4. The method of claim 1 wherein the fluidized bed reactor contains a catalyst and wherein the weight hourly space velocity of the solid hydrocarbonaceous material passed through the one or more feed ports in comparison to the catalyst contained in the fluidized bed reactor is at least 0.1 $hr^{-1}$.

5. The method of claim 1 wherein the carbon percent yield of aromatics plus olefins in the one or more fluid hydrocarbon products is at least 20%.

6. The method of claim 1 wherein the carbon percent yield of para-xylene plus meta-xylene in the one or more fluid hydrocarbon products is at least 1.5%.

7. The method of claim 1 wherein the carbon percent yield of methane in the one or more fluid hydrocarbon products is less than 10%.

8. The method of claim 1 wherein the catalytically reacting takes place in the presence of a catalyst bed, and wherein the residence time of the gas introduced through the fluidization port in contact with the catalyst bed is at least 1.0 seconds.

9. The method of claim 1 wherein the maximum angle of the one or more feed ports is about −90 degrees from the horizontal at the point at which the one or more feed ports enters the fluidized bed reactor.

10. The method of claim 9 wherein prior to said injecting the solid hydrocarbonaceous material into the gas jet, the gas jet is carried through a carrier flow tube, wherein the angle that the carrier flow tube makes with the horizontal is greater than the angle at which the one or more feed ports enters the fluidized bed reactor, both angles being positive values.

11. The method of claim 1 wherein the ratio of carrier fluid flow rate through the one or more feed ports to the gas flow rate through the fluidization port is between 0.01 and 5.

12. The method of claim 1 wherein the solid hydrocarbonaceous material comprises particles having a density at least 0.5 g/cc and an average diameter from 1 micron to 20,000 microns.

13. The method of claim 1 wherein the fluidized bed reactor comprises a catalyst and wherein a mass ratio of the catalyst to the solid hydrocarbonaceous material is in the range from 0.3 to 20.

14. The method of claim 1 wherein the fluidized bed reactor comprises a catalyst comprising a material selected from the group consisting of: natural or synthetic ferrierite, zeolite Y, zeolite beta, mordenite, MCM-22, ZSM-5, ZSM-12, ZSM-23, ZSM-35, ZSM-57, SUZ-4, EU-1, ZSM-11, SAPO-31, and SSZ-23.

15. The method of claim 1 wherein the fluidized bed reactor comprises a catalyst comprising at least one of:
  (i) a metal selected from the group consisting of nickel, platinum, vanadium, palladium, chromium, manganese, iron, cobalt, zinc, copper, gallium, at least one rare earth metal, and combinations thereof; or
  (ii) an oxide of a metal, wherein the metal is selected from the group consisting of nickel, platinum, vanadium, palladium, chromium, manganese, iron, cobalt, zinc, copper, gallium, at least one rare earth metal, and combinations thereof.

16. The method of claim 1 wherein prior to passing the solid hydrocarbonaceous material through the one or more feed ports, cooling the solid hydrocarbonaceous material by the flow of a cooling fluid.

17. The method of claim 1 wherein the carrier fluid comprises a material selected from the group consisting of CO, CO2, olefins, hydrogen, steam, methane, ethane, propane, nitrogen, and argon.

18. The method of claim 1 wherein the solid hydrocarbonaceous material is injected into the gas jet by an automated solid hydrocarbonaceous material metering system comprising pinch valves and a holding tank.

19. The method of claim 1 wherein the fluidized bed reactor comprises a catalyst and wherein the catalyst is fed in a continuous or semi-continuous manner to the fluidized bed reactor and the catalyst is withdrawn in a continuous or semi-continuous manner from the fluidized bed reactor.

20. The method of claim 1 wherein the carrier fluid flows through the one or more feed ports with a linear velocity of from 100 cm/sec to 5,000 cm/sec.

21. The method of claim 1 wherein the duration of flow of solid hydrocarbonaceous material during an individual pulse is from 0.05 seconds to 30 seconds in length.

22. The method of claim 1 wherein the duration of flow of solid hydrocarbonaceous material during an individual pulse is shorter than the time between pulses.

23. The method of claim 1 wherein the fluidized bed reactor comprises more than one feed port and wherein the timing of pulses from the feed ports is either simultaneous or staggered with respect to time.

24. The method of claim 1 wherein the fluidized bed reactor comprises more than one feed port and wherein the feed ports are at different heights along the fluidized bed reactor.

25. The method of claim 1 wherein a catalyst is mixed with the solid hydrocarbonaceous material prior to passing the solid hydrocarbonaceous material to the fluidized bed reactor.

26. The method of claim 25 wherein an additional amount of the catalyst is introduced into the fluidized bed reactor separately from the catalyst that is mixed with the solid hydrocarbonaceous material, wherein the mass of the additional amount of the catalyst is larger than the mass of the catalyst that is mixed with the solid hydrocarbonaceous material and wherein the additional amount of the catalyst is at a higher temperature than that of the solid hydrocarbonaceous material.

27. The method of claim 26 wherein the additional amount of the catalyst is at a higher temperature than the catalyst that is mixed with the solid hydrocarbonaceous material.

28. The method of claim 1 wherein the carbon percent yield of methane in the one or more fluid hydrocarbon products is between 1.1% and 10%.

29. A method for producing one or more pyrolysis products from a solid hydrocarbonaceous material comprising:
  feeding a first reactant comprising the solid hydrocarbonaceous material to a fluidized bed reactor comprising a distributor by injecting the solid hydrocarbonaceous material in one or more gas jets comprising a carrier gas to produce one or more gas jets comprising the solid hydrocarbonaceous material, wherein the solid hydrocarbonaceous material is injected into the gas jet in discontinuous pulses, and subsequently passing the one or more gas jets containing the solid hydrocarbonaceous material to the fluidized bed reactor through one or more feed ports, wherein the carrier gas is at a temperature of less than 200° C. at which the one or more feed ports enters the fluidized bed reactor, to form a gas mixture comprising suspended solid hydrocarbonaceous material in a lower section of the fluidized bed reactor that has a normalized temperature in the range of 100° C. to 600° C.;
  pyrolyzing at least a portion of the gas mixture comprising suspended solid hydrocarbonaceous material in a catalyzed reaction at a temperature of at least 500° C. within an upper section of the fluidized bed reactor to produce the one or more pyrolysis products; wherein the upper section is above the lower section with respect to gravity; wherein the lower section comprises a volume that includes an inner diameter of the fluidized bed reactor and a height that is at least 2% of the height of the fluidized bed reactor, and wherein the upper section comprises a volume that includes an inner diameter of the fluidized bed reactor and a height that is at least 5% of the height of the fluidized bed reactor; wherein the lower and upper sections are both above the distributor.

30. The method of claim 29 further comprising feeding a fluidizing gas through a fluidization port into the lower section wherein the fluidizing gas passes through the distributor prior to entering the lower section.

31. The method of claim 29 wherein the lower section does not contain any catalyst trays and the upper section comprises at least one catalyst tray.

32. The method of claim 29 wherein the fluidized bed reactor comprises a catalyst and wherein the lower section contains less than 10 wt % of the catalyst and the upper section contains at least 50 wt % of the catalyst.

33. The method of claim 29 wherein the pyrolyzing in the upper section takes place at a temperature in the range of 500° C. to 800° C.

* * * * *